United States Patent [19]

Müller

[11] Patent Number: 5,601,622
[45] Date of Patent: Feb. 11, 1997

[54] FIBRE-REACTIVE ANTHRAQUINONE DYES, PROCESS FOR THEIR PREPARATION, AND THEIR USE

[75] Inventor: Bernhard Müller, Efringen-Kirchen, Germany

[73] Assignee: Ciba-Geigy Corporation, Tarrytown, N.Y.

[21] Appl. No.: 541,008

[22] Filed: Oct. 11, 1995

[30] Foreign Application Priority Data

Oct. 14, 1994 [CH] Switzerland .................... 3093/94

[51] Int. Cl.⁶ .................... D06P 3/66; C09B 1/30; C09B 1/34
[52] U.S. Cl. .................... 8/676; 552/230; 552/232; 552/233; 8/677; 8/918; 8/688; 8/696
[58] Field of Search .................... 552/230, 232, 552/233; 544/188, 189; 8/543, 549, 676, 677, 679, 688, 696

[56] References Cited

U.S. PATENT DOCUMENTS

| | | | |
|---|---|---|---|
| 3,226,176 | 12/1965 | Hindermann et al. | |
| 4,325,705 | 4/1982 | Harms et al. | 8/676 |
| 4,355,163 | 10/1982 | von Oertzen et al. | 544/189 |
| 4,507,236 | 3/1985 | Seiler et al. | 534/634 |
| 4,631,341 | 12/1986 | Kayane et al. | 544/189 |
| 4,925,927 | 5/1990 | Tzikas | 534/618 |
| 5,410,041 | 4/1995 | Müller | 540/126 |

FOREIGN PATENT DOCUMENTS

| | | |
|---|---|---|
| 74928 | 3/1983 | European Pat. Off. |
| 584045 | 2/1994 | European Pat. Off. |
| 1529645 | 10/1978 | United Kingdom |
| 2034731 | 6/1980 | United Kingdom |

OTHER PUBLICATIONS

Chem. Abstracts, vol. 84, (18), abstract No. 123403a of JP 75-157422; Dec. 1975.
Derwent Abstract No. 85-300340/48 of JO208-366 A Oct. 19, 1985.

*Primary Examiner*—Margaret Einsmann
*Attorney, Agent, or Firm*—Kevin T. Mansfield

[57] ABSTRACT

Anthraquinone dyes of the formula

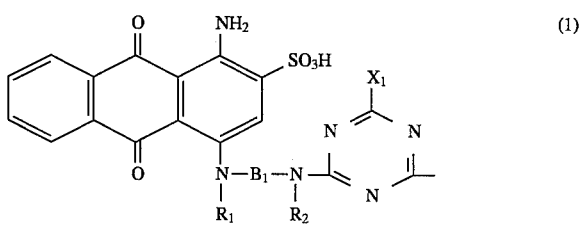
(1)

-continued

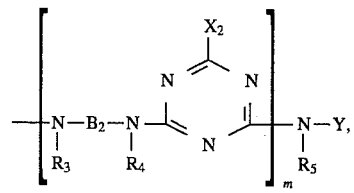

in which $R_1$, $R_2$, $R_3$, $R_4$ and $R_5$ independently of one another are hydrogen or are substituted or unsubstituted $C_1$–$C_{12}$alkyl, $X_1$ and $X_2$ independently of one another are chlorine or fluorine, $B_1$ is a $C_2$–$C_{12}$alkylene radical which is unsubstituted or substituted by hydroxyl, sulfo or sulfato and is uninterrupted or is interrupted by oxygen; or is a cyclohexylene radical, $C_1$–$C_4$alkylene-cyclohexylene radical, cyclohexylene-$C_1$–$C_4$alkylene radical, $C_1$–$C_4$alkylene-cyclohexylene-$C_1$–$C_4$alkylene radical or cyclohexylene-methylene-cyclohexylene radical which is unsubstituted or is substituted in the cyclohexylene ring by $C_1$–$C_4$alkyl; or is a $C_1$–$C_4$alkylene-phenylene radical, phenylene-$C_1$–$C_4$alkylene radical or $C_1$–$C_4$alkylene-phenylene-$C_1$–$C_4$alkylene radical which is unsubstituted or is substituted in the phenylene ring by $C_1$–$C_4$alkyl, $C_1$–$C_4$alkoxy, $C_2$–$C_4$alkanoylamino, sulfo, halogen or carboxyl, $B_2$ is an aromatic bridge member, Y is hydrogen, substituted or unsubstituted $C_1$–$C_{12}$alkyl, or a radical of the benzene or naphthalene series, and m is the number 0 or 1, with the proviso that, if m is the number 0, the radical Y contains a fibre-reactive group with the formula

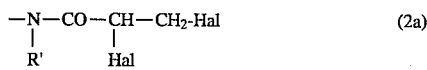
(2a)

or

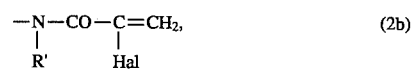
(2b)

where Hal is halogen.

16 Claims, No Drawings

FIBRE-REACTIVE ANTHRAQUINONE DYES, PROCESS FOR THEIR PREPARATION, AND THEIR USE

The present invention relates to novel fibre-reactive anthraquinone dyes, to a process for their preparation and to their use for the dyeing or printing of fibre materials.

The practice of dyeing with reactive dyes has led in recent times to increased requirements regarding the quality of the dyeings and the economy of the dyeing process. As a result there continues to be a need for novel reactive dyes which have improved properties, in particular with respect to their application.

For dyeing nowadays, reactive dyes are required which combine sufficient substantivity with ready ease of washoff of the unfixed portions. They should in addition show a good dyeing yield and be of high reactivity, the intention being in particular to give dyeings having high degrees of fixation. These requirements are not met by all of the properties of the known dyes.

The object of the present invention is therefore to find novel, improved reactive dyes for the dyeing and printing of fibre materials, which possess the qualities characterized above to a high degree. The novel dyes should in particular be distinguished by high fixation yields and high stabilities of the fibre-dye bonds, and, in addition, the portions not fixed to the fibre should be able to be washed off readily. The dyes should, moreover, give dyeings having good all-round fastness properties, for example light fastness and wet fastness properties.

It has been found that the said object can be largely achieved with the novel reactive dyes defined below.

The invention therefore provides anthraquinone dyes of the formula

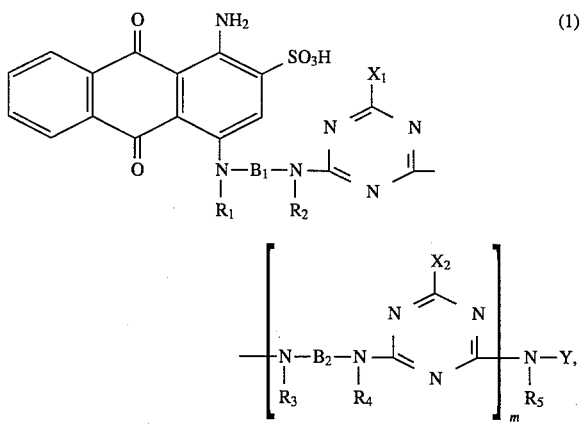

in which $R_1$, $R_2$, $R_3$, $R_4$ and $R_5$ independently of one another are hydrogen or are substituted or unsubstituted $C_1$–$C_{12}$alkyl, $X_1$ and $X_2$ independently of one another are chlorine or fluorine, $B_1$ is a $C_2$–$C_{12}$alkylene radical which is unsubstituted or substituted by hydroxyl, sulfo or sulfato and is uninterrupted or is interrupted by oxygen; or is a cyclohexylene radical, $C_1$–$C_4$alkylene-cyclohexylene radical, cyclohexylene-$C_1$–$C_4$alkylene radical, $C_1$–$C_4$alkylene-cyclohexylene-$C_1$–$C_4$alkylene radical or cyclohexylene-methylene-cyclohexylene radical which is unsubstituted or is substituted in the cyclohexylene ring by $C_1$–$C_4$alkyl; or is a $C_1$–$C_4$alkylene-phenylene radical, phenylene-$C_1$–$C_4$alkylene radical or $C_1$–$C_4$alkylene-phenylene-$C_1$–$C_4$alkylene radical which is unsubstituted or is substituted in the phenylene ring by $C_1$–$C_4$alkyl, $C_1$–$C_4$alkoxy, $C_2$–$C_4$alkanoylamino, sulfo, halogen or carboxyl, $B_2$ is an aromatic bridge member, Y is hydrogen, substituted or unsubstituted $C_1$–$C_{12}$alkyl, or a radical of the benzene or naphthalene series, and m is the number 0 or 1, with the proviso that, if m is the number 0, the radical Y contains a fibre-reactive group with the formula

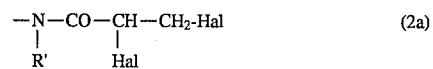

or

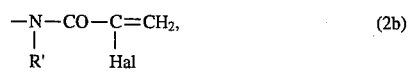

in which Hal is halogen and R' is hydrogen or $C_1$–$C_4$alkyl.

Suitable $C_1$–$C_{12}$alkyl radicals for $R_1$, $R_2$, $R_3$, $R_4$, $R_5$ and Y are preferably $C_1$–$C_{10}$alkyl radicals, especially $C_1$–$C_8$alkyl radicals. The alkyl radicals mentioned can, with the exception of methyl, be interrupted by, for example, oxygen, preferably by 1, 2 or 3 members —O—, in particular by 1 or 2 members —O—. The alkyl radicals mentioned may in addition be unsubstituted or substituted by, for example, hydroxyl, sulfo or sulfato, preferably by hydroxyl or sulfo and in particular by hydroxyl. The radical Y as alkyl can additionally be substituted by the radical of an anthraquinone dye, such as, for example, by a radical of 1,4-diaminoanthraquinone-2-sulfonic acid, which radical is attached via the amino group in position 4.

Suitable $C_2$–$C_{12}$alkylene radicals for $B_1$ are preferably $C_2$–$C_{10}$alkylene radicals, especially $C_2$–$C_8$alkylene radicals. $C_2$–$C_6$alkylene radicals are of particular interest. The alkylene radicals mentioned can be interrupted by, for example, oxygen, preferably by 1, 2 or 3 members —O—, in particular by 1 or 2 members —O—. The alkylene radicals mentioned can in addition be unsubstituted or substituted by hydroxyl, sulfo or sulfato, preferably by hydroxyl or sulfo and in particular by hydroxyl. The alkylene radicals mentioned are preferably unsubstituted. Examples of such alkylene radicals are —(CH$_2$)$_6$—, —(CH$_2$)$_2$—O—(CH$_2$)$_2$—O—(CH$_2$)$_2$—, —(CH$_2$)$_3$—O—(CH$_2$)$_4$—O—(CH$_2$)$_3$—, —CH$_2$—CH$_2$—CH(C$_2$H$_5$)—, —(CH$_2$)$_3$—CH(CH$_3$)—CH$_2$— and in particular —(CH$_2$)$_3$— and —CH$_2$—C(CH$_3$)$_2$—CH$_2$—.

Suitable substituents of the cyclohexylene radicals mentioned for $B_1$ are in particular methyl or ethyl, preferably methyl. If, in such bridging members $B_1$, the cyclohexylene radical is connected to a $C_1$–$C_4$alkylene radical, then this $C_1$–$C_4$alkylene radical is preferably a methylene radical.

The $C_1$–$C_4$alkylene-phenylene radicals, phenylene-$C_1$–$C_4$alkylene radicals and $C_1$–$C_4$alkylene-phenylene-$C_1$–$C_4$alkylene radicals mentioned for $B_1$ can be unsubstituted or substituted in the phenylene rings by, for example, $C_1$–$C_4$alkyl such as methyl, ethyl, propyl, isopropyl, butyl, sec-butyl, ten-butyl or isobutyl, especially methyl, by $C_1$–$C_4$alkoxy such as methoxy, ethoxy, propoxy, isopropoxy, butoxy or isobutoxy, especially methoxy, by $C_2$–$C_4$alkanoylamino, for example acetylamino or propionylamino, by halogen, for example fluorine, chlorine or bromine, especially chlorine, or by sulfo or carboxyl; they are preferably unsubstituted or substituted by $C_1$–$C_4$alkyl, $C_1$–$C_4$alkoxy, halogen or sulfo. The corresponding unsubstituted radicals are of particular interest. The $C_1$–$C_4$alkylene radicals present in such bridging members $B_1$ are preferably methylene radicals. Of particular importance in this context are $C_1$–$C_4$alkylene-phenylene-$C_1$–$C_4$alkylene radicals, especially methylene-phenylene-methylene radicals.

A suitable aromatic bridging member $B_2$ is, for example, phenylene or naphthalene, which can be unsubstituted or substituted by, for example, $C_1$–$C_4$alkyl such as methyl, ethyl, propyl, isopropyl, butyl, sec-butyl, tert-butyl or isobutyl, especially methyl, by $C_1$–$C_4$alkoxy such as methoxy, ethoxy, propoxy, isopropoxy, butoxy or isobutoxy, especially methoxy, by $C_2$–$C_4$alkanoylamino, for example acetylamino or propionylamino, by halogen, for example fluorine, chlorine or bromine, especially chlorine, or by sulfo or carboxyl. The phenylene and naphthalene radicals are preferably unsubstituted or substituted by $C_1$–$C_4$alkyl, $C_1$–$C_4$alkoxy, halogen or sulfo. Of particular interest in this context are the phenylene radicals, especially sulfo-substituted phenylene radicals.

The phenyl and naphthyl radicals mentioned for Y can be unsubstituted or substituted, for example, as indicated above for $B_2$. The phenyl and naphthyl radicals mentioned for Y can in addition be substituted by a fibre-reactive group.

Examples of such fibre-reactive groups are those of the formulae

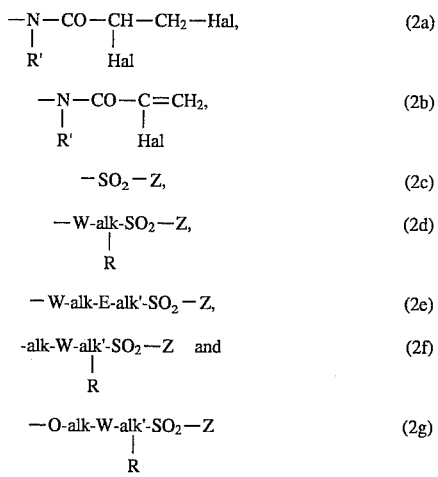

in which

W is a group of the formula —$SO_2$—$NR_6$—, —$CONR_6$— or —$NR_6CO$—, $R_6$ is hydrogen or is $C_1$–$C_4$alkyl which is unsubstituted or is substituted by hydroxyl, sulfo, sulfato, carboxyl or cyano, R is hydrogen, hydroxyl, sulfo, sulfato, carboxyl, cyano, halogen, $C_1$–$C_4$alkoxycarbonyl, $C_1$–$C_4$alkanoyloxy or carbamoyl, R' is hydrogen or $C_1$–$C_4$alkyl, Z is a group of the formula —CH=$CH_2$ or —$CH_2$—$CH_2$—$U_1$ and $U_1$ is a leaving group, Hal is halogen, E is the radical —O— or —$NR_7$— and $R_7$ is hydrogen or $C_1$–$C_4$alkyl, and alk and alk' are independently of one another $C_1$–$C_6$alkylene.

Examples of suitable leaving groups $U_1$ are —Cl, —Br, —F, —$OSO_3H$, —$SSO_3H$, —OCO—$CH_3$, —$OPO_3H_2$, —OCO—$CCl_3$, —OCO—$CHCl_2$, —OCO—$CH_2Cl$, —$OSO_2$—$C_1$–$C_4$alkyl, —$OSO_2$—N($C_1$–$C_4$alkyl)$_2$ or —OCO—$C_6H_5$.

$U_1$ is preferably a group of the formula —Cl, —$OSO_3H$, —$SSO_3H$, —OCO—$CH_3$, —OCO—$C_6H_5$ or —$OPO_3H_2$, especially —Cl or —$OSO_3H$, preferably —$OSO_3H$.

alk and alk' are independently of one another, for example, a methylene, ethylene, 1,3-propylene, 1,4-butylene, 1,5-pentylene or 1,6-hexylene radical or branched isomers thereof.

alk and alk' are preferably a $C_1$–$C_4$alkylene radical and, with particular preference, are an ethylene radical.

R is preferably hydrogen.

R' is preferably hydrogen.

$R_6$ is preferably hydrogen or $C_1$–$C_4$alkyl such as methyl, ethyl, propyl, isopropyl, butyl, isobutyl, sec-butyl or tert-butyl. $R_6$ is with particular preference hydrogen.

E is preferably —NH— or —O— and with particular preference is —O—.

W is preferably a group of the formula —CONH— or —NHCO—, especially a group of the formula —CONH—.

Hal in the radical of the formulae (2a) and (2b) is preferably chlorine or, in particular, bromine.

Preferred reactive radicals of the formula (2a) to (2g) are those in which W is a group of the formula —CONH— or —NHCO—, in particular a group of the formula —CONH—, R is hydrogen, E is the radical —O— or —NH—, Hal is chlorine or bromine and $U_1$ is a group of the formula —Cl, —$OSO_3H$, —$SSO_3H$, —OCO—$CH_3$,—OCO—$C_6H_5$ or —$OPO_3H_2$, in particular a group of the formula —Cl or —$OSO_3H$. R' is preferably hydrogen.

Particularly preferred reactive radicals are those of the formulae (2a) to (2d) in which the abovementioned definitions and preferences apply for Hal, Z, W, R and R'.

$R_1$, $R_2$, $R_3$ and $R_4$ are preferably hydrogen or $C_1$–$C_4$alkyl, especially hydrogen.

$R_5$ is preferably hydrogen or $C_1$–$C_8$alkyl which is unsubstituted or is substituted by hydroxyl, sulfo or sulfato and, with the exception of methyl, is uninterrupted or is interrupted by oxygen, and is preferably hydrogen or unsubstituted or hydroxyl-substituted $C_1$–$C_4$alkyl, and especially hydrogen.

$R_1$, $R_2$, $R_3$ and $R_4$ are with particular preference hydrogen or $C_1$–$C_4$alkyl, especially hydrogen, and $R_5$ is hydrogen or is $C_1$–$C_8$alkyl which is unsubstituted or is substituted by hydroxyl, sulfo or sulfato and, with the exception of methyl, is uninterrupted or is interrupted by oxygen, and is in particular hydrogen or unsubstituted or hydroxyl-substituted $C_1$–$C_4$alkyl, and is preferably hydrogen.

$B_1$ is preferably $C_2$–$C_{12}$alkylene which is uninterrupted or is interrupted by oxygen; or is a methylene-cyclohexylene radical, cyclohexylene-methylene radical or cyclohexylene-methylene-cyclohexylene radical which is unsubstituted or is substituted in the cyclohexylene ring by $C_1$–$C_4$alkyl; or is a methylene-phenylene-methylene radical which is unsubstituted or is substituted in the phenylene ring by $C_1$–$C_4$alkyl, $C_1$–$C_4$alkoxy, halogen or sulfo.

With particular preference, $B_1$ is $C_2$–$C_{12}$alkylene which is uninterrupted or is interrupted by oxygen; or is a methylene-cylohexylene radical or cyclohexylene-methylene radical which is unsubstituted or is substituted in the cyclohexylene ring by $C_1$–$C_4$alkyl; or is a methylene-phenylene-methylene radical.

As the bridge member $B_1$, the corresponding alkylene radicals are of particular interest. With very particular preference, $B_1$ is $C_2$–$C_6$alkylene, especially a radical of the formula —$(CH_2)_3$— or, preferably, a radical of the formula —$CH_2$—$C(CH_3)_2$—$CH_2$—.

$B_2$ is preferably unsubstituted or $C_1$–$C_4$alkyl-, $C_{C4}$alkoxy-, $C_2$–$C_4$alkanoylamino-, halogen-, carboxyl- or sulfo-substituted naphthalene or, preferably, phenylene.

With particular preference, $B_2$ is phenylene which is unsubstituted or is substituted by $C_1$–$C_4$alkyl, $C_1$–$C_4$alkoxy, halogen or sulfo, preferably sulfo-substituted phenylene.

Preferred anthraquinone dyes of the formula (1) in which m is the number 1 are those in which Y is hydrogen or is $C_1$–$C_{12}$alkyl which is unsubstituted or substituted by hydroxyl, sulfo or sulfato and, with the exception of methyl, is uninterrupted or interrupted by oxygen; or Y is phenyl or naphthyl, where the phenyl and naphthyl radicals can be substituted by $C_1$–$C_4$alkyl, $C_1$–$C_4$alkoxy, $C_2$–$C_4$alkanoylamino, halogen, carboxyl or sulfo or by one of the fibre-reactive groups of the formulae (2a) to (2g), in particular of the formulae (2a) to (2d); or Y is an anthraquinone radical of the formula

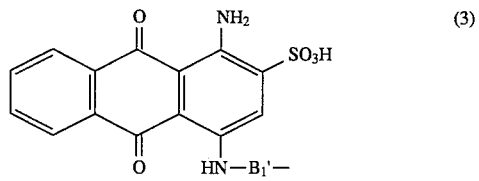
(3)

in which case, for $B_1'$, the definitions and preferences indicated above for $B_1$ apply.

Y here is preferably hydrogen or $C_1$–$C_8$alkyl which is unsubstituted or substituted by hydroxyl, sulfo or sulfato and, with the exception of methyl, is uninterrupted or is interrupted by oxygen; or is an anthraquinone radical of the formula (3); or is sulfo-substituted naphthyl; or is phenyl which can be substituted by $C_1$–$C_4$alkyl, $C_1$–$C_4$alkoxy, halogen or sulfo or by a fibre-reactive radical of the formula (2a), (2b), (2c) or (2d), where W is a group of the formula —CO—NH—, R is hydrogen, R' is preferably hydrogen and $U_1$ is sulfato or chlorine. Of particular interest for Y are the corresponding phenyl radicals.

Particularly preferred anthraquinone dyes of the formula (1) in which m is the number 1 are those in which $R_1, R_2, R_3$ and $R_4$ are hydrogen or $C_1$–$C_4$alkyl, especially hydrogen, $R_5$ is hydrogen or is $C_1$–$C_8$alkyl which is unsubstituted or is substituted by hydroxyl, sulfo or sulfato and, with the exception of methyl, is uninterrupted or is interrupted by oxygen, and in particular is hydrogen or $C_1$–$C_8$alkyl which is unsubstituted or substituted by hydroxyl and, with the exception of methyl, is uninterrupted or interrupted by oxygen, and is preferably hydrogen, $B_1$ is $C_2$–$C_{12}$alkylene which is uninterrupted or is interrupted by oxygen; or is a methylene-cyclohexylene radical, cyclohexylene-methylene radical or cyclohexylene-methylene-cyclohexylene radical which is unsubstituted or is substituted in the cyclohexylene ring by $C_1$–$C_4$alkyl; or is a methylene-phenylene-methylene radical which is unsubstituted or is substituted in the phenylene ring by $C_1$–$C_4$alkyl, $C_1$–$C_4$alkoxy, halogen or sulfo, $B_2$ is phenylene which is unsubstituted or is substituted by $C_1$–$C_4$alkyl, $C_1$–$C_4$alkoxy, halogen or sulfo, and Y is hydrogen or is $C_1$–$C_8$alkyl which is unsubstituted or is substituted by hydroxyl, sulfo or sulfato and, with the exception of methyl, is uninterrupted or is interrupted by oxygen; or is an anthraquinone radical of the formula (3); or is sulfo-substituted naphthyl; or is phenyl which can be substituted by $C_1$–$C_4$alkyl, $C_1$–$C_4$alkoxy, halogen or sulfo or by a fibre-reactive radical of the formulae (2a), (2b), (2c) or (2d), where W is a group of the formula —CO—NH—, R is hydrogen and $U_1$ is sulfato or chlorine. Of particular interest in this context are anthraquinone dyes in which $B_1$ is $C_2$–$C_6$alkylene and $B_2$ is sulfo-substituted phenylene. R' is preferably hydrogen.

Preferred anthraquinone dyes of the formula (1) in which m is the number 0 are those in which Y is phenyl or naphthyl which is unsubstituted or is substituted by $C_1$–$C_4$alkyl, $C_1$–$C_4$alkoxy, $C_2$–$C_4$alkanoylamino, halogen, carboxyl or sulfo, where the phenyl and naphthyl radicals contain at least one of the fibre-reactive groups of the formulae (2a) and (2b).

Particularly preferred anthraquinone dyes of the formula (I) in which m is the number 0 are those in which $R_1, R_2, R_3$ and $R_4$ are hydrogen or $C_1$–$C_4$alkyl, especially hydrogen, $R_5$ is hydrogen or is $C_1$–$C_8$alkyl which is unsubstituted or is substituted by hydroxyl, sulfo or sulfato and, with the exception of methyl, is uninterrupted or is interrupted by oxygen, especially hydrogen or $C_1$–$C_8$alkyl which is unsubstituted or is substituted by hydroxyl and, with the exception of methyl, is uninterrupted or is interrupted by oxygen, and is preferably hydrogen, $B_1$ is $C_2$–$C_{12}$alkylene which is uninterrupted or is interrupted by oxygen; or is a methylene-cyclohexylene radical, cyclohexylene-methylene radical or cyclohexylene-methylene-cyclohexylene radical which is unsubstituted or is substituted in the cyclohexylene ring by $C_1$–$C_4$alkyl; or is a methylene-phenylene-methylene radical which is unsubstituted or is substituted in the phenylene ring by $C_1$–$C_4$alkyl, $C_1$–$C_4$alkoxy, halogen or sulfo, $B_2$ is phenylene which is unsubstituted or is substituted by $C_1$–$C_4$alkyl, $C_1$–$C_4$alkoxy, halogen or sulfo, and Y is phenyl which is unsubstituted or is substituted by $C_1$–$C_4$alkyl, $C_1$–$C_4$alkoxy, halogen or sulfo, the phenyl radical containing at least one of the fibre-reactive groups of the formulae (2a) and (2b). Of particular interest in this context are anthraquinone dyes in which $B_1$ is $C_2$–$C_6$alkylene and $B_2$ is sulfo-substituted phenylene.

The present invention additionally provides a process for the preparation of anthraquinone dyes of the formula (1), which comprises reacting with one another compounds of the formulae

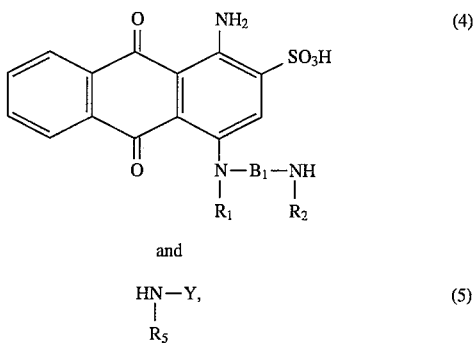

and $$HN-Y, \quad (5)$$
$$\phantom{HN-}|$$
$$\phantom{HN-}R_5$$

cyanuric fluoride or cyanuric chloride and, if desired, a compound of the formula

with or without a subsequent conversion reaction, the definitions and preferences indicated above applying for $R_1$, $R_2$, $R_3$, $R_4$, $R_5$, $B_1$, $B_2$ and Y.

Since the individual process steps indicated above can be carried out in a variety of sequences, and in some cases even simultaneously; there is a variety of possible process variants. The reaction is generally carried out stepwise in succession, with the sequence of the single reactions between the individual reaction components depending advantageously on the particular conditions.

For example, in order to prepare anthraquinone dyes of the formula (1) in which m is the number 0, a compound of the formula (5) is reacted with cyanuric fluoride or cyanuric chloride and the resulting product is then subjected to a condensation reaction with the compound of the formula (4).

A process variant for preparing anthraquinone dyes of the formula (1) in which m is the number 1 comprising reacting a compound of the formula (5) with cyanuric fluoride or cyanuric chloride, then reacting the resulting product with the compound of the formula (6), subjecting that product to a condensation reaction with cyanuric fluoride or cyanuric chloride and then subjecting the resulting product to a condensation reaction with the compound of the formula (4).

A further process variant for preparing anthraquinone dyes of the formula (1) in which m is the number 1 comprises reacting a compound of the formula (6) with cyanuric fluoride or cyanuric chloride and then subjecting the resulting product to a condensation reaction with the compound of the formula (4). The product thus obtained is then reacted with the product from the condensation of the compound of the formula (5) and cyanuric fluoride or cyanuric chloride.

In addition, as conversion reactions, elimination reactions can be appended to the synthesis. For example, anthraquinone dyes of the formula (1) which contain sulfatoethylsulfonyl radicals or α,β-dihalopropionylamino radicals can be treated with a base, for example sodium hydroxide, in which case the sulfatoethylsulfonyl radicals are converted to vinylsulfonyl radicals or the α,β-dihalopropionylamino radicals are converted to α-haloacryloylamino radicals.

In principle, the anthraquinone dyes of the formula (1) can be prepared starting from precursors or intermediates of dyes which contain fibre-reactive radicals, or these fibre-reactive radicals are introduced into intermediates suitable for this purpose which have the character of dyes.

The compounds of the formulae (4), (5) and (6) are known or can be obtained in analogy to known compounds.

The individual condensation reactions take place, for example, in accordance with processes which are known per se, generally in aqueous solution at a temperature of, for example, from 0 to 50° C., in particular from 0 to 10° C., and at a pH of, for example, from 4 to 10.

The dyes of the formula (1) according to the invention are either in the form of their free acid or, preferably, as the salts thereof. Examples of suitable salts are the alkali metal, alkaline earth metal or ammonium salts or the salts of an organic amine. Examples are the sodium, lithium, potassium or ammonium salts or the salt of mono-, di- or triethanolamine.

The dyes according to the invention are suitable for the dyeing and printing of a very wide variety of materials, such as hydroxyl-containing or nitrogen-containing fibre materials. Examples are silk, leather, wool, polyamide fibres and polyurethanes, and, in particular, cellulose-containing fibre materials of all kinds. Examples of such cellulose-containing fibre materials are the natural cellulose fibres such as cotton, linen and hemp, and also pulp and regenerated cellulose. The dyes according to the invention are also suitable for dyeing or printing hydroxyl-containing fibres present in blend fabrics, for example blends of cotton with polyester fibres or polyamide fibres. The dyes according to the invention are particularly suitable for the dyeing or printing of cellulose-containing fibre-materials. In addition, they can be used to dye or print natural or synthetic polyamide fibre materials, especially wool or synthetic polyamide fibre materials.

The dyes according to the invention can be applied to the fibre materials and fixed on the fibre in various ways, in particular in the form of aqueous dye solutions and print pastes. They are suitable not only for the exhaust method but also for dyeing by the padding method, in accordance with which the fabric is impregnated with aqueous dye solutions which may or may not contain salt, and the dyes are fixed after alkali treatment or in the presence of alkali, with or without the action of heat. They are particularly suitable for the cold pad-batch process, according to which the dye together with the alkali is applied to the padder and subsequently fixed by storage for several hours at room temperature. After fixation, the dyeings or prints are rinsed thoroughly with cold and hot water, with or without the addition of a dispersant which also promotes the diffusion of the unfixed portions.

The dyes according to the invention are distinguished by high reactivity, good fixation capacity and a very good buildup capacity. They can therefore be used by the exhaust dyeing method at low dyeing temperatures and require only short steaming times in the pad-steam method. The degrees of fixation are high, and the unfixed portions are easy to wash off, the difference between the degree of exhaustion and the degree of fixation being remarkably small, i.e. the loss on soaping being very low. The dyes according to the invention are also particularly suitable for printing, especially on cotton, but also for printing nitrogen-containing fibres, for example wool, silk or blend fabrics which include wool or silk.

The dyeings and prints produced using the dyes according to the invention have a high colour strength and a high fibre-dye bond stability not only in the acid but also in the akaline range, and also have good light fastness and very good wet fastness properties, such as wash, water, salt water, cross-dyeing and perspiration fastness properties, and also good fastness to pleating, to hot pressing and to rubbing.

The examples which follow are intended to illustrate the invention. The temperatures are indicated in degrees Celsius, parts are parts by weight, and the percentages are by weight, unless noted otherwise. Pans by weight relate to parts by volume as the kilogram to the liter.

EXAMPLE 1

19 pans of cyanuric chloride are stirred vigorously into 50 parts of water, with the addition of a wetting agent and 5 parts of disodium hydrogen phosphate, at a temperature of 0° C. A neutral solution of 17 parts of 2-aminobenzenesulfonic acid in 170 parts of water is added dropwise. During this addition, the pH is kept constant at a value of 4.5 by adding sodium hydroxide solution. After the end of reaction, a solution of 19 parts of 2,4-diaminobenzenesulfonic acid in 190 parts of water, which is rendered neutral with sodium hydroxide solution, is added dropwise, with the pH being held constant at a value of 7 by addition of sodium hydroxide solution. When starting material can no longer be detected by thin-layer chromatography, the solution is added dropwise to a suspension of 19 parts of cyanuric chloride in 50 parts of water which has been cooled to a temperature of 0° C. and is buffered with 5 parts of disodium hydrogen phosphate, the pH being held at a value of 7 by addition of sodium hydroxide solution until condensation is complete.

To the solution thus obtained is added, dropwise, a further solution of 38 parts of 1-amino-4-(3-aminopropyl)anthraquinone-2-sulfonic acid, dissolved with 4 parts of lithium hydroxide monohydrate in 380 parts of water, at a rate such that the pH does not exceed a value of 10. Subsequently, the pH is maintained at a value of 9.5 until the end of the reaction. Following neutralization, the sodium chloride formed is removed by dialysis and the dye solution is concentrated by evaporation in vacuo. A dye is obtained which in the form of the free acid corresponds to the compound of the formula

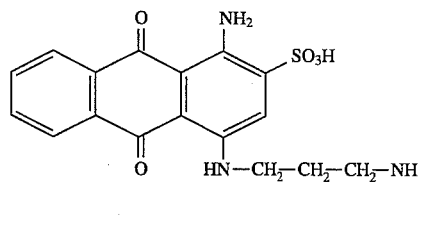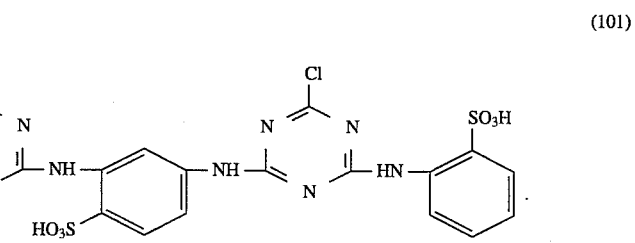

(101)

The dye of the formula (101) dyes cotton and wool in blue shades.

EXAMPLE 2

19 pans of cyanuric chloride are stirred vigorously into 50 parts of water, with the addition of a wetting agent and 5 parts of disodium hydrogen phosphate, at a temperature of 0° C. A neutral solution of 19 parts of 2,4-diaminobenzenesulfonic acid in 190 parts of water is added dropwise. During this addition the pH is kept constant at a value of 4.5 by addition of sodium hydroxide solution. The resulting solution is added dropwise to a solution of 38 pans of 1-amino-4-(3-aminopropyl)anthraquinone-2-sulfonic acid, dissolved with 4 parts of lithium hydroxide monohydrate in 380 parts of water, at a rate such that the pH does not exceed a value of 10. The pH is subsequently kept at a value of 9.5 until the end of the reaction (solution 1 ).

19 parts of cyanuric chloride are stirred vigorously into 50 parts of water, with the addition of a wetting agent and 5 parts of disodium hydrogen phosphate, at a temperature of 0° C. A neutral solution of 17 parts of 2-aminobenzenesulfonic acid in 170 pans of water is added. During this addition, the pH is held constant at a value of 4.5 by addition of sodium hydroxide solution. The solution 1 obtainable as indicated above is added dropwise to this solution at a rate such that the pH does not exceed a value of 7. The pH is then held at a value of 7 until the end of the reaction. The sodium chloride formed is removed by dialysis and the dye solution is concentrated by evaporation in vacuo. A dye is obtained which in the form of the free acid corresponds to the compound of the formula

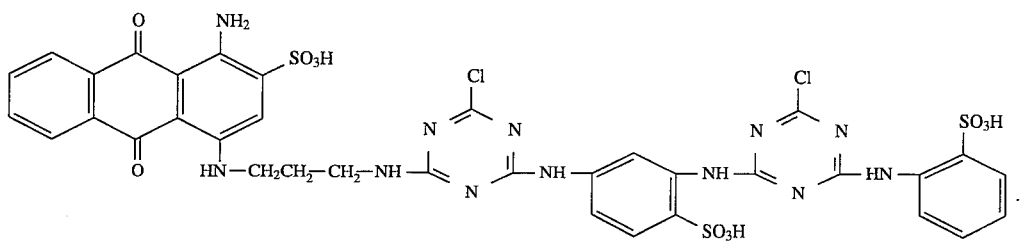
(102)

The dye of the formula (102) dyes cotton and wool in blue shades.

EXAMPLES 3 to 305

Following the procedure of Example 1 or of Example 2 but using instead of 17 parts of 2-aminobenzenesulfonic acid, an equimolar quantity of an amine of the formula H-$V_1$, and instead of 38 parts of 1-amino-4-(3-aminopropyl)anthraquinone-2-sulfonic acid, an equimolar quantity of an anthraquinone compound of the formula

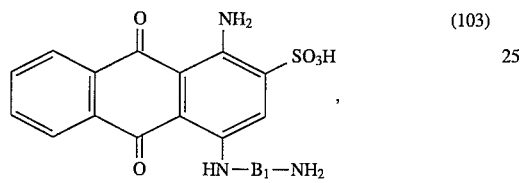
(103)

gives the dyes indicated in Table 1 below of the general formula

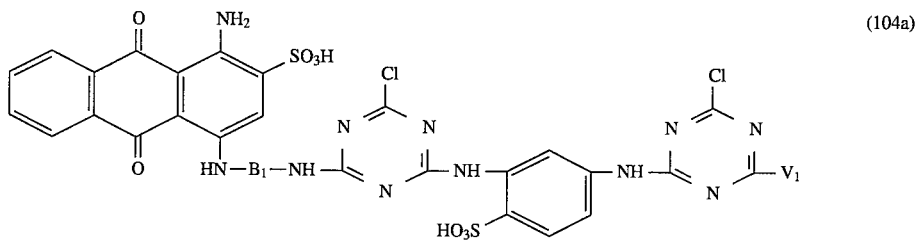
(104a)

or

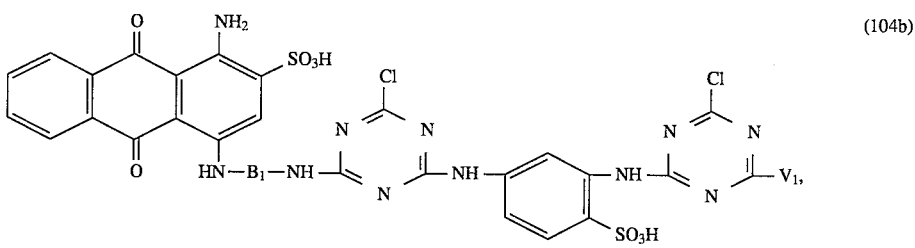
(104b)

respectively, where $B_1$ and $V_1$ are in each case defined as indicated in Table 1 below. The dyes indicated in Table 1 dye cotton and wool in blue shades.

TABLE 1

| Ex. | $V_1$ | $B_1$ |
|---|---|---|
| 3 | —HN—(2-SO₃H, 4-CH₃)phenyl | —(CH₂)₆— |
| 4 | —HN—(2-SO₃H, 4-OCH₃)phenyl | —(CH₂)₆— |
| 5 | —NH—(3-SO₃H)phenyl | —(CH₂)₆— |
| 6 | —NH—(3-SO₃H, 4-CH₃)phenyl | —(CH₂)₆— |
| 7 | —NH—(3-SO₃H, 4-OCH₃)phenyl | —(CH₂)₆— |
| 8 | —NH—(2-SO₃H, 4-SO₃H)phenyl | —(CH₂)₆— |
| 9 | —NH—(2-SO₃H, 4-CH₃, 5-SO₃H)phenyl | —(CH₂)₆— |
| 10 | —NH—(2-SO₃H, 4-OCH₃, 5-SO₃H)phenyl | —(CH₂)₆— |
| 11 | —NH—(4-SO₃H)phenyl | —(CH₂)₆— |
| 12 | —NH—(2-SO₃H, 4-SO₃H)phenyl | —(CH₂)₆— |
| 13 | —NH—2-naphthyl(1-SO₃H) | —(CH₂)₆— |
| 14 | —NH—2-naphthyl(1-SO₃H, 5-SO₃H) | —(CH₂)₆— |

TABLE 1-continued

| Ex. | V₁ | B₁ |
|---|---|---|
| 15 | —NH—[naphthalene with SO₃H at 1-position and SO₃H at 5-position] | —(CH₂)₆— |
| 16 | —NH—[naphthalene with SO₃H at 1-position and SO₃H at 3-position] | —(CH₂)₆— |
| 17 | —NH—[naphthalene with SO₃H at 1, HO₃S at 6, SO₃H at 3] | —(CH₂)₆— |
| 18 | —NH—[phenyl with o-SO₃H and p-SO₂—CH₂CH₂—OSO₃H] | —(CH₂)₆— |
| 19 | —NH—[phenyl with o-SO₃H and p-SO₂—CH=CH₂] | —(CH₂)₆— |
| 20 | —NH—[phenyl with SO₃H and SO₂—CH₂CH₂—OSO₃H] | —(CH₂)₆— |
| 21 | —NH—[phenyl with SO₃H and SO₂—CH=CH₂] | —(CH₂)₆— |
| 22 | —NH—[phenyl with SO₃H and C(O)—NH—(CH₂)₂—SO₂—(CH₂)₂—OSO₃H] | —(CH₂)₆— |
| 23 | —NH—[phenyl with SO₃H and C(O)—NH—(CH₂)₂—SO₂—CH=CH₂] | —(CH₂)₆— |

TABLE 1-continued

| Ex. | V₁ | B₁ |
|---|---|---|
| 24 | 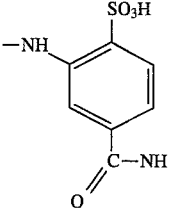 3-NH-, 4-SO₃H phenyl with 5-C(O)-NH-(CH₂)₂-SO₂-(CH₂)₂-OSO₃H | —(CH₂)₆— |
| 25 | 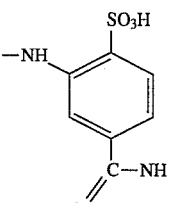 3-NH-, 4-SO₃H phenyl with 5-C(O)-NH-(CH₂)₂-SO₂-CH=CH₂ | —(CH₂)₆— |
| 26 | 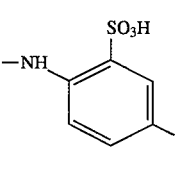 4-NH-, 3-SO₃H phenyl with 5-NH-C(O)-CH(Br)-CH₂-Br | —(CH₂)₆— |
| 27 | 4-NH-, 3-SO₃H phenyl with 5-NH-C(O)-C(Br)=CH₂ | —(CH₂)₆— |
| 28 | 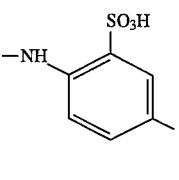 3-NH-, 4-SO₃H phenyl with 5-NH-C(O)-CH(Br)-CH₂-Br | —(CH₂)₆— |
| 29 | 3-NH-, 4-SO₃H phenyl with 5-NH-C(O)-C(Br)=CH₂ | —(CH₂)₆— |
| 30 | —NH—CH₂CH₂—SO₃H | —(CH₂)₆— |
| 31 | —N(CH₃)—CH₂CH₂—SO₃H | —(CH₂)₆— |
| 32 | —NH₂ | —(CH₂)₆— |
| 33 | —NH—CH₂CH₂—OH | —(CH₂)₆— |
| 34 | —N(CH₃)—CH₂CH₂—OH | —(CH₂)₆— |
| 35 | —NH—CH₂CH₂—OCH₃ | —(CH₂)₆— |
| 36 | —NH—CH₂CH₂—O—CH₂CH₂—OH | —(CH₂)₆— |

TABLE 1-continued

| Ex. | $V_1$ | $B_1$ |
|---|---|---|
| 37 | $-N(CH_2CH_2-OH)-CH_2CH_2-OH$ | $-(CH_2)_6-$ |
| 38 | 1-amino-4-(3-aminopropylamino)anthraquinone-2-sulfonic acid (with terminal $HN-CH_2CH_2-CH_2-NH-$) | $-(CH_2)_6-$ |
| 39 | 1-amino-4-(neopentylenediamino)anthraquinone-2-sulfonic acid (with terminal $HN-CH_2-C(CH_3)_2-CH_2-NH-$) | $-(CH_2)_6-$ |
| 40 | $-NH-$ (2-sulfophenyl) | $-(CH_2)_2-O-(CH_2)_2-O-(CH_2)_2-$ |
| 41 | $-HN-$ (2-sulfo-4-methylphenyl) | $-(CH_2)_2-O-(CH_2)_2-O-(CH_2)_2-$ |
| 42 | $-HN-$ (2-sulfo-4-methoxyphenyl) | $-(CH_2)_2-O-(CH_2)_2-O-(CH_2)_2-$ |
| 43 | $-NH-$ (3-sulfophenyl) | $-(CH_2)_2-O-(CH_2)_2-O-(CH_2)_2-$ |
| 44 | $-NH-$ (3-sulfo-4-methylphenyl) | $-(CH_2)_2-O-(CH_2)_2-O-(CH_2)_2-$ |
| 45 | $-NH-$ (3-sulfo-4-methoxyphenyl) | $-(CH_2)_2-O-(CH_2)_2-O-(CH_2)_2-$ |
| 46 | $-NH-$ (2,5-disulfophenyl with SO$_3$H at 4-position) | $-(CH_2)_2-O-(CH_2)_2-O-(CH_2)_2-$ |
| 47 | $-NH-$ (disulfo-methylphenyl) | $-(CH_2)_2-O-(CH_2)_2-O-(CH_2)_2-$ |
| 48 | $-NH-$ (disulfo-methoxyphenyl) | $-(CH_2)_2-O-(CH_2)_2-O-(CH_2)_2-$ |

TABLE 1-continued

| Ex. | V$_1$ | B$_1$ |
|---|---|---|
| 49 | —NH—C$_6$H$_4$—SO$_3$H (4-sulfo) | —(CH$_2$)$_2$—O—(CH$_2$)$_2$—O—(CH$_2$)$_2$— |
| 50 | —NH—C$_6$H$_3$(SO$_3$H)$_2$ (2,4-disulfo) | —(CH$_2$)$_2$—O—(CH$_2$)$_2$—O—(CH$_2$)$_2$— |
| 51 | 2-amino-naphthalene-1-sulfonic acid residue | —(CH$_2$)$_2$—O—(CH$_2$)$_2$—O—(CH$_2$)$_2$— |
| 52 | 2-amino-naphthalene-1,5-disulfonic acid residue | —(CH$_2$)$_2$—O—(CH$_2$)$_2$—O—(CH$_2$)$_2$— |
| 53 | 2-amino-naphthalene-1,5-disulfonic acid residue (isomer) | —(CH$_2$)$_2$—O—(CH$_2$)$_2$—O—(CH$_2$)$_2$— |
| 54 | 2-amino-naphthalene-1,6-disulfonic acid residue | —(CH$_2$)$_2$—O—(CH$_2$)$_2$—O—(CH$_2$)$_2$— |
| 55 | 2-amino-naphthalene-1,5,7-trisulfonic acid residue | —(CH$_2$)$_2$—O—(CH$_2$)$_2$—O—(CH$_2$)$_2$— |
| 56 | —NH—C$_6$H$_3$(SO$_3$H)(SO$_2$—CH$_2$CH$_2$—OSO$_3$H) | —(CH$_2$)$_2$—O—(CH$_2$)$_2$—O—(CH$_2$)$_2$— |
| 57 | —NH—C$_6$H$_3$(SO$_3$H)(SO$_2$—CH=CH$_2$) | —(CH$_2$)$_2$—O—(CH$_2$)$_2$—O—(CH$_2$)$_2$— |
| 58 | —NH—C$_6$H$_3$(SO$_3$H)(SO$_2$—CH$_2$CH$_2$—OSO$_3$H) (isomer) | —(CH$_2$)$_2$—O—(CH$_2$)$_2$—O—(CH$_2$)$_2$— |

TABLE 1-continued

| Ex. | V₁ | B₁ |
|---|---|---|
| 59 | 2-amino-4-(vinylsulfonyl)benzenesulfonic acid: –NH–C₆H₃(SO₃H)(SO₂–CH=CH₂)– | –(CH₂)₂–O–(CH₂)₂–O–(CH₂)₂– |
| 60 | 4-amino-3-sulfo-benzamide with –C(O)–NH–(CH₂)₂–SO₂–(CH₂)₂–OSO₃H | –(CH₂)₂–O–(CH₂)₂–O–(CH₂)₂– |
| 61 | 4-amino-3-sulfo-benzamide with –C(O)–NH–(CH₂)₂–SO₂–CH=CH₂ | –(CH₂)₂–O–(CH₂)₂–O–(CH₂)₂– |
| 62 | 3-amino-4-sulfo-benzamide with –C(O)–NH–(CH₂)₂–SO₂–(CH₂)₂–OSO₃H | –(CH₂)₂–O–(CH₂)₂–O–(CH₂)₂– |
| 63 | 3-amino-4-sulfo-benzamide with –C(O)–NH–(CH₂)₂–SO₂–CH=CH₂ | –(CH₂)₂–O–(CH₂)₂–O–(CH₂)₂– |
| 64 | 4-amino-3-sulfo-phenyl-HN–C(O)–CH(Br)–CH₂–Br | –(CH₂)₂–O–(CH₂)₂–O–(CH₂)₂– |
| 65 | 4-amino-3-sulfo-phenyl-HN–C(O)–C(Br)=CH₂ | –(CH₂)₂–O–(CH₂)₂–O–(CH₂)₂– |
| 66 | 3-amino-4-sulfo-phenyl-HN–C(O)–CH(Br)–CH₂–Br | –(CH₂)₂–O–(CH₂)₂–O–(CH₂)₂– |

TABLE 1-continued

| Ex. | $V_1$ | $B_1$ |
|---|---|---|
| 67 | 2-SO₃H, 5-(HN-C(=O)-C(Br)=CH₂) anilino (–NH– attached to phenyl bearing –SO₃H ortho and –NH–C(=O)–C(Br)=CH₂ para) | $-(CH_2)_2-O-(CH_2)_2-O-(CH_2)_2-$ |
| 68 | $-NH-CH_2CH_2-SO_3H$ | $-(CH_2)_2-O-(CH_2)_2-O-(CH_2)_2-$ |
| 69 | $-N(CH_3)-CH_2CH_2-SO_3H$ | $-(CH_2)_2-O-(CH_2)_2-O-(CH_2)_2-$ |
| 70 | $-NH_2$ | $-(CH_2)_2-O-(CH_2)_2-O-(CH_2)_2-$ |
| 71 | $-NH-CH_2CH_2-OH$ | $-(CH_2)_2-O-(CH_2)_2-O-(CH_2)_2-$ |
| 72 | $-N(CH_3)-CH_2CH_2-OH$ | $-(CH_2)_2-O-(CH_2)_2-O-(CH_2)_2-$ |
| 73 | $-NH-CH_2CH_2-OCH_3$ | $-(CH_2)_2-O-(CH_2)_2-O-(CH_2)_2-$ |
| 74 | $-NH-CH_2CH_2-O-CH_2CH_2-OH$ | $-(CH_2)_2-O-(CH_2)_2-O-(CH_2)_2-$ |
| 75 | $-N(CH_2CH_2-OH)-CH_2CH_2-OH$ | $-(CH_2)_2-O-(CH_2)_2-O-(CH_2)_2-$ |
| 76 | 1-amino-2-sulfo-4-(propylenediamino)anthraquinone: anthraquinone with 1-NH₂, 2-SO₃H, 4-HN–CH₂CH₂–CH₂–NH– | $-(CH_2)_2-O-(CH_2)_2-O-(CH_2)_2-$ |
| 77 | 1-amino-2-sulfo-4-(2,2-dimethylpropylenediamino)anthraquinone: anthraquinone with 1-NH₂, 2-SO₃H, 4-HN–CH₂–C(CH₃)₂–CH₂–NH– | $-(CH_2)_2-O-(CH_2)_2-O-(CH_2)_2-$ |
| 78 | $-NH$-(2-sulfophenyl) | $-CH_2-C(CH_3)_2-CH_2-$ |
| 79 | $-HN$-(2-sulfo-4-methylphenyl) | $-CH_2-C(CH_3)_2-CH_2-$ |
| 80 | $-HN$-(2-sulfo-4-methoxyphenyl) | $-CH_2-C(CH_3)_2-CH_2-$ |
| 81 | $-NH$-(3-sulfophenyl) | $-CH_2-C(CH_3)_2-CH_2-$ |

TABLE 1-continued

| Ex. | V₁ | B₁ |
|---|---|---|
| 82 | —NH—C₆H₃(SO₃H)(CH₃) (4-SO₃H, 3-CH₃ on aniline) | —CH₂—C(CH₃)₂—CH₂— |
| 83 | —NH—C₆H₃(SO₃H)(OCH₃) (4-SO₃H, 3-OCH₃) | —CH₂—C(CH₃)₂—CH₂— |
| 84 | —NH—C₆H₃(SO₃H)(SO₃H) (2,5-disulfo aniline) | —CH₂—C(CH₃)₂—CH₂— |
| 85 | —NH—C₆H₂(SO₃H)(SO₃H)(CH₃) | —CH₂—C(CH₃)₂—CH₂— |
| 86 | —NH—C₆H₂(SO₃H)(SO₃H)(OCH₃) | —CH₂—C(CH₃)₂—CH₂— |
| 87 | —NH—C₆H₄—SO₃H (4-sulfoanilino) | —CH₂—C(CH₃)₂—CH₂— |
| 88 | —NH—C₆H₃(SO₃H)(SO₃H) (2,4-disulfoanilino) | —CH₂—C(CH₃)₂—CH₂— |
| 89 | —NH-(2-naphthyl)-1-SO₃H | —CH₂—C(CH₃)₂—CH₂— |
| 90 | —NH-(2-naphthyl)-1,5-di-SO₃H | —CH₂—C(CH₃)₂—CH₂— |
| 91 | —NH-(2-naphthyl)-5,8-di-SO₃H | —CH₂—C(CH₃)₂—CH₂— |
| 92 | —NH-(2-naphthyl)-6,8-di-SO₃H | —CH₂—C(CH₃)₂—CH₂— |
| 93 | —NH-(2-naphthyl)-3,6,8-tri-SO₃H | —CH₂—C(CH₃)₂—CH₂— |

TABLE 1-continued

| Ex. | $V_1$ | $B_1$ |
|---|---|---|
| 94 | —NH—C$_6$H$_3$(SO$_3$H)—SO$_2$—CH$_2$CH$_2$—OSO$_3$H | —CH$_2$—C(CH$_3$)$_2$—CH$_2$— |
| 95 | —NH—C$_6$H$_3$(SO$_3$H)—SO$_2$—CH=CH$_2$ | —CH$_2$—C(CH$_3$)$_2$—CH$_2$— |
| 96 | —NH—C$_6$H$_3$(SO$_3$H)—SO$_2$—CH$_2$CH$_2$—OSO$_3$H | —CH$_2$—C(CH$_3$)$_2$—CH$_2$— |
| 97 | —NH—C$_6$H$_3$(SO$_3$H)—SO$_2$—CH=CH$_2$ | —CH$_2$—C(CH$_3$)$_2$—CH$_2$— |
| 98 | —NH—C$_6$H$_3$(SO$_3$H)—C(O)—NH—(CH$_2$)$_2$—SO$_2$—(CH$_2$)$_2$—OSO$_3$H | —CH$_2$—C(CH$_3$)$_2$—CH$_2$— |
| 99 | —NH—C$_6$H$_3$(SO$_3$H)—C(O)—NH—(CH$_2$)$_2$—SO$_2$—CH=CH$_2$ | —CH$_2$—C(CH$_3$)$_2$—CH$_2$— |
| 100 | —NH—C$_6$H$_3$(SO$_3$H)—C(O)—NH—(CH$_2$)$_2$—SO$_2$—(CH$_2$)$_2$—OSO$_3$H | —CH$_2$—C(CH$_3$)$_2$—CH$_2$— |
| 101 | —NH—C$_6$H$_3$(SO$_3$H)—C(O)—NH—(CH$_2$)$_2$—SO$_2$—CH=CH$_2$ | —CH$_2$—C(CH$_3$)$_2$—CH$_2$— |

5,601,622

31 32

TABLE 1-continued

| Ex. | V₁ | B₁ |
|---|---|---|
| 102 | 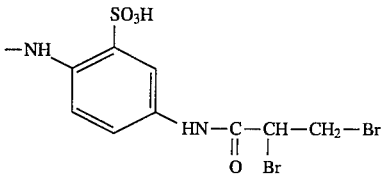 | $-CH_2-\underset{\underset{CH_3}{\mid}}{\overset{\overset{CH_3}{\mid}}{C}}-CH_2-$ |
| 103 | 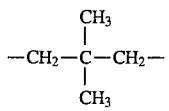 | $-CH_2-\underset{\underset{CH_3}{\mid}}{\overset{\overset{CH_3}{\mid}}{C}}-CH_2-$ |
| 104 | 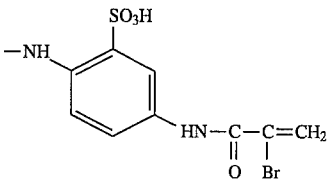 | $-CH_2-\underset{\underset{CH_3}{\mid}}{\overset{\overset{CH_3}{\mid}}{C}}-CH_2-$ |
| 105 | 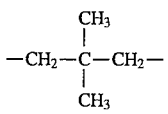 | $-CH_2-\underset{\underset{CH_3}{\mid}}{\overset{\overset{CH_3}{\mid}}{C}}-CH_2-$ |
| 106 | $-NH-CH_2CH_2-SO_3H$ | $-CH_2-\underset{\underset{CH_3}{\mid}}{\overset{\overset{CH_3}{\mid}}{C}}-CH_2-$ |
| 107 | $-\underset{\underset{CH_3}{\mid}}{N}-CH_2CH_2-SO_3H$ | $-CH_2-\underset{\underset{CH_3}{\mid}}{\overset{\overset{CH_3}{\mid}}{C}}-CH_2-$ |
| 108 | $-NH_2$ | $-CH_2-\underset{\underset{CH_3}{\mid}}{\overset{\overset{CH_3}{\mid}}{C}}-CH_2-$ |
| 109 | $-NH-CH_2CH_2-OH$ | $-CH_2-\underset{\underset{CH_3}{\mid}}{\overset{\overset{CH_3}{\mid}}{C}}-CH_2-$ |
| 110 | $-\underset{\underset{CH_3}{\mid}}{N}-CH_2CH_2-OH$ | $-CH_2-\underset{\underset{CH_3}{\mid}}{\overset{\overset{CH_3}{\mid}}{C}}-CH_2-$ |
| 111 | $-NH-CH_2CH_2-OCH_3$ | $-CH_2-\underset{\underset{CH_3}{\mid}}{\overset{\overset{CH_3}{\mid}}{C}}-CH_2-$ |

TABLE 1-continued

| Ex. | V₁ | B₁ |
|---|---|---|
| 112 | $-NH-CH_2CH_2-O-CH_2CH_2-OH$ | $-CH_2-\underset{\underset{CH_3}{\mid}}{\overset{\overset{CH_3}{\mid}}{C}}-CH_2-$ |
| 113 | $-N(CH_2CH_2-OH)-CH_2CH_2-OH$ | $-CH_2-\underset{\underset{CH_3}{\mid}}{\overset{\overset{CH_3}{\mid}}{C}}-CH_2-$ |
| 114 | 1-amino-4-(3-aminopropylamino)anthraquinone-2-sulfonic acid (linked via terminal NH) | $-CH_2-\underset{\underset{CH_3}{\mid}}{\overset{\overset{CH_3}{\mid}}{C}}-CH_2-$ |
| 115 | 1-amino-4-[(2,2-dimethyl-3-aminopropyl)amino]anthraquinone-2-sulfonic acid (linked via terminal NH) | $-CH_2-\underset{\underset{CH_3}{\mid}}{\overset{\overset{CH_3}{\mid}}{C}}-CH_2-$ |
| 116 | $-NH$-(2-sulfophenyl) | $-(CH_2)_3-\underset{}{\overset{\overset{CH_3}{\mid}}{CH}}-CH_2-$ |
| 117 | $-NH$-(2-sulfo-4-methylphenyl) | $-(CH_2)_3-\overset{\overset{CH_3}{\mid}}{CH}-CH_2-$ |
| 118 | $-NH$-(2-sulfo-4-methoxyphenyl) | $-(CH_2)_3-\overset{\overset{CH_3}{\mid}}{CH}-CH_2-$ |
| 119 | $-NH$-(3-sulfophenyl) | $-(CH_2)_3-\overset{\overset{CH_3}{\mid}}{CH}-CH_2-$ |
| 120 | $-NH$-(3-sulfo-4-methylphenyl) | $-(CH_2)_3-\overset{\overset{CH_3}{\mid}}{CH}-CH_2-$ |
| 121 | $-NH$-(3-sulfo-4-methoxyphenyl) | $-(CH_2)_3-\overset{\overset{CH_3}{\mid}}{CH}-CH_2-$ |
| 122 | $-NH$-(2,5-disulfophenyl) | $-(CH_2)_3-\overset{\overset{CH_3}{\mid}}{CH}-CH_2-$ |
| 123 | $-NH$-(2-sulfo-4-methyl-5-sulfophenyl) | $-(CH_2)_3-\overset{\overset{CH_3}{\mid}}{CH}-CH_2-$ |

TABLE 1-continued

| Ex. | V$_1$ | B$_1$ |
|---|---|---|
| 124 | —NH—C$_6$H$_2$(SO$_3$H)(SO$_3$H)(OCH$_3$) [2,5-disulfo-4-methoxyphenylamino; HO$_3$S at position adjacent, SO$_3$H para, OCH$_3$ ortho to SO$_3$H] | —(CH$_2$)$_3$—CH(CH$_3$)—CH$_2$— |
| 125 | —NH—C$_6$H$_4$—SO$_3$H (4-sulfo) | —(CH$_2$)$_3$—CH(CH$_3$)—CH$_2$— |
| 126 | —NH—C$_6$H$_3$(SO$_3$H)$_2$ (2,4-disulfo) | —(CH$_2$)$_3$—CH(CH$_3$)—CH$_2$— |
| 127 | —NH—(2-naphthyl)-1-SO$_3$H | —(CH$_2$)$_3$—CH(CH$_3$)—CH$_2$— |
| 128 | —NH—(2-naphthyl)-1,5-(SO$_3$H)$_2$ | —(CH$_2$)$_3$—CH(CH$_3$)—CH$_2$— |
| 129 | —NH—(2-naphthyl)-1,6-(SO$_3$H)$_2$ | —(CH$_2$)$_3$—CH(CH$_3$)—CH$_2$— |
| 130 | —NH—(2-naphthyl)-1,3-(SO$_3$H)$_2$ (7-amino-1,3-disulfo) | —(CH$_2$)$_3$—CH(CH$_3$)—CH$_2$— |
| 131 | —NH—(2-naphthyl)-1,3,6-(SO$_3$H)$_3$ | —(CH$_2$)$_3$—CH(CH$_3$)—CH$_2$— |
| 132 | —NH—C$_6$H$_3$(SO$_3$H)(SO$_2$—CH$_2$CH$_2$—OSO$_3$H) | —(CH$_2$)$_3$—CH(CH$_3$)—CH$_2$— |
| 133 | —NH—C$_6$H$_3$(SO$_3$H)(SO$_2$—CH=CH$_2$) | —(CH$_2$)$_3$—CH(CH$_3$)—CH$_2$— |
| 134 | —NH—C$_6$H$_3$(SO$_3$H)(SO$_2$—CH$_2$CH$_2$—OSO$_3$H) | —(CH$_2$)$_3$—CH(CH$_3$)—CH$_2$— |

TABLE 1-continued

| Ex. | V$_1$ | B$_1$ |
|---|---|---|
| 135 | 2-NH-, 4-SO$_2$-CH=CH$_2$, 1-SO$_3$H phenyl | -(CH$_2$)$_3$-CH(CH$_3$)-CH$_2$- |
| 136 | 4-NH-, 3-SO$_3$H, 1-C(O)-NH-(CH$_2$)$_2$-SO$_2$-(CH$_2$)$_2$-OSO$_3$H phenyl | -(CH$_2$)$_3$-CH(CH$_3$)-CH$_2$- |
| 137 | 4-NH-, 3-SO$_3$H, 1-C(O)-NH-(CH$_2$)$_2$-SO$_2$-CH=CH$_2$ phenyl | -(CH$_2$)$_3$-CH(CH$_3$)-CH$_2$- |
| 138 | 2-NH-, 1-SO$_3$H, 4-C(O)-NH-(CH$_2$)$_2$-SO$_2$-(CH$_2$)$_2$-OSO$_3$H phenyl | -(CH$_2$)$_3$-CH(CH$_3$)-CH$_2$- |
| 139 | 2-NH-, 1-SO$_3$H, 4-C(O)-NH-(CH$_2$)$_2$-SO$_2$-CH=CH$_2$ phenyl | -(CH$_2$)$_3$-CH(CH$_3$)-CH$_2$- |
| 140 | 4-NH-, 3-SO$_3$H, 1-NH-C(O)-CHBr-CH$_2$-Br phenyl | -(CH$_2$)$_3$-CH(CH$_3$)-CH$_2$- |
| 141 | 4-NH-, 3-SO$_3$H, 1-NH-C(O)-C(Br)=CH$_2$ phenyl | -(CH$_2$)$_3$-CH(CH$_3$)-CH$_2$- |
| 142 | 2-NH-, 1-SO$_3$H, 4-NH-C(O)-CHBr-CH$_2$-Br phenyl | -(CH$_2$)$_3$-CH(CH$_3$)-CH$_2$- |

TABLE 1-continued

| Ex. | V₁ | B₁ |
|---|---|---|
| 143 | 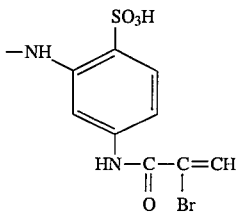 | $-(CH_2)_3-\underset{\underset{CH_3}{\mid}}{CH}-CH_2-$ |
| 144 | $-NH-CH_2CH_2-SO_3H$ | $-(CH_2)_3-\underset{\underset{CH_3}{\mid}}{CH}-CH_2-$ |
| 145 | $-\underset{\underset{CH_3}{\mid}}{N}-CH_2CH_2-SO_3H$ | $-(CH_2)_3-\underset{\underset{CH_3}{\mid}}{CH}-CH_2-$ |
| 146 | $-NH_2$ | $-(CH_2)_3-\underset{\underset{CH_3}{\mid}}{CH}-CH_2-$ |
| 147 | $-NH-CH_2CH_2-OH$ | $-(CH_2)_3-\underset{\underset{CH_3}{\mid}}{CH}-CH_2-$ |
| 148 | $-\underset{\underset{CH_3}{\mid}}{N}-CH_2CH_2-OH$ | $-(CH_2)_3-\underset{\underset{CH_3}{\mid}}{CH}-CH_2-$ |
| 149 | $-NH-CH_2CH_2-OCH_3$ | $-(CH_2)_3-\underset{\underset{CH_3}{\mid}}{CH}-CH_2-$ |
| 150 | $-NH-CH_2CH_2-O-CH_2CH_2-OH$ | $-(CH_2)_3-\underset{\underset{CH_3}{\mid}}{CH}-CH_2-$ |
| 151 | $-\underset{\underset{CH_2CH_2-OH}{\mid}}{N}-CH_2CH_2-OH$ | $-(CH_2)_3-\underset{\underset{CH_3}{\mid}}{CH}-CH_2-$ |
| 152 | 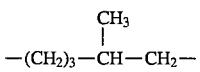 | $-(CH_2)_3-\underset{\underset{CH_3}{\mid}}{CH}-CH_2-$ |
| 153 | 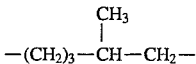 | $-(CH_2)_3-\underset{\underset{CH_3}{\mid}}{CH}-CH_2-$ |
| 154 | 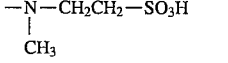 | 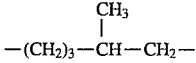 |
| 155 | 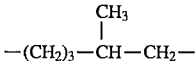 | 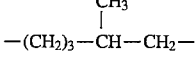 |

TABLE 1-continued

| Ex. | V₁ | B₁ |
|---|---|---|
| 156 | —HN—C₆H₃(SO₃H)(OCH₃) (2-SO₃H, 4-OCH₃) | —CH₂—C₆H₄—CH₂— (meta) |
| 157 | —NH—C₆H₄—SO₃H (meta) | —CH₂—C₆H₄—CH₂— (meta) |
| 158 | —NH—C₆H₃(SO₃H)(CH₃) (4-SO₃H, 3-CH₃) | —CH₂—C₆H₄—CH₂— (meta) |
| 159 | —NH—C₆H₃(SO₃H)(OCH₃) (3-SO₃H, 4-OCH₃) | —CH₂—C₆H₄—CH₂— (meta) |
| 160 | —NH—C₆H₃(SO₃H)(SO₃H) (4-SO₃H, 2-SO₃H) | —CH₂—C₆H₄—CH₂— (meta) |
| 161 | —NH—C₆H₂(SO₃H)(SO₃H)(CH₃) (4-SO₃H, 2-SO₃H, 5-CH₃) | —CH₂—C₆H₄—CH₂— (meta) |
| 162 | —NH—C₆H₂(SO₃H)(SO₃H)(OCH₃) (4-SO₃H, 2-SO₃H, 5-OCH₃) | —CH₂—C₆H₄—CH₂— (meta) |
| 163 | —NH—C₆H₄—SO₃H (para) | —CH₂—C₆H₄—CH₂— (meta) |
| 164 | —NH—C₆H₃(SO₃H)(SO₃H) (4-SO₃H, 2-SO₃H) | —CH₂—C₆H₄—CH₂— (meta) |
| 165 | —NH—(2-naphthyl)-1-SO₃H | —CH₂—C₆H₄—CH₂— (meta) |

TABLE 1-continued

| Ex. | V₁ | B₁ |
|---|---|---|
| 166 | 2-amino-naphthalene-1,5-disulfonic acid (−NH− at 2-position, SO₃H at 1,5) | −CH₂−(m-C₆H₄)−CH₂− |
| 167 | 2-amino-naphthalene-1,6-disulfonic acid (−NH− at 2-position, SO₃H at 1,6) | −CH₂−(m-C₆H₄)−CH₂− |
| 168 | 2-amino-naphthalene-1,3-disulfonic acid (−NH− at 2-position, SO₃H at 1,3) | −CH₂−(m-C₆H₄)−CH₂− |
| 169 | 2-amino-naphthalene-1,3,6-trisulfonic acid (−NH−, SO₃H at 1,3,6) | −CH₂−(m-C₆H₄)−CH₂− |
| 170 | −NH−C₆H₃(SO₃H)(SO₂−CH₂CH₂−OSO₃H) (2-SO₃H, 4-SO₂CH₂CH₂OSO₃H on anilino) | −CH₂−(m-C₆H₄)−CH₂− |
| 171 | −NH−C₆H₃(SO₃H)(SO₂−CH=CH₂) (2-SO₃H, 4-SO₂CH=CH₂ on anilino) | −CH₂−(m-C₆H₄)−CH₂− |
| 172 | −NH−C₆H₃(SO₃H)(SO₂−CH₂CH₂−OSO₃H) (3-SO₃H, 4-SO₂CH₂CH₂OSO₃H on anilino) | −CH₂−(m-C₆H₄)−CH₂− |
| 173 | −NH−C₆H₃(SO₃H)(SO₂−CH=CH₂) (3-SO₃H, 4-SO₂CH=CH₂ on anilino) | −CH₂−(m-C₆H₄)−CH₂− |
| 174 | −NH−C₆H₃(SO₃H)(C(O)NH−(CH₂)₂−SO₂−(CH₂)₂−OSO₃H) (3-SO₃H, 4-C(O)NH(CH₂)₂SO₂(CH₂)₂OSO₃H on anilino) | −CH₂−(m-C₆H₄)−CH₂− |

TABLE 1-continued
| Ex. | $V_1$ | $B_1$ |
|---|---|---|
| 175 | 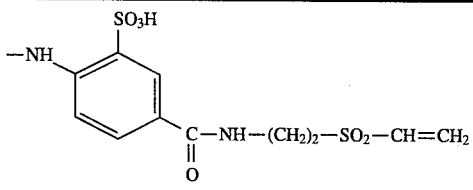 | 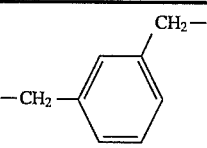 |
| 176 | 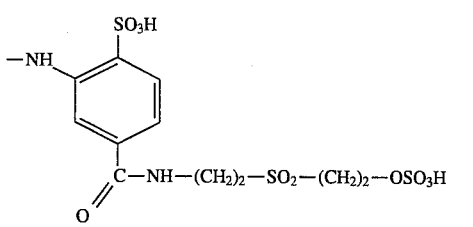 | 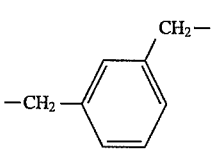 |
| 177 | 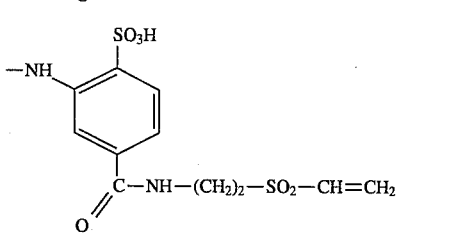 | 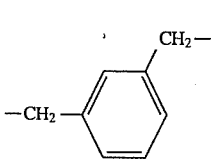 |
| 178 | 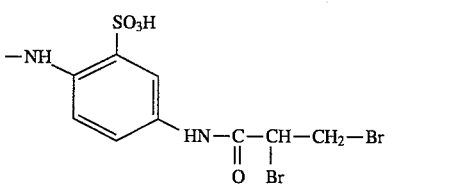 | 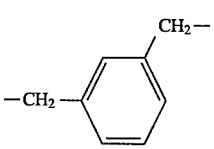 |
| 179 | 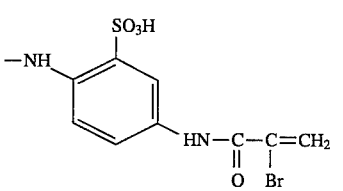 | 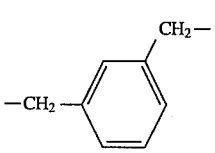 |
| 180 | 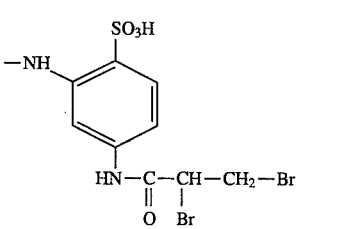 | 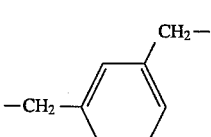 |
| 181 | 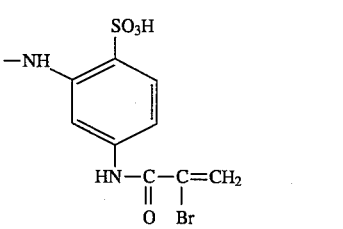 | 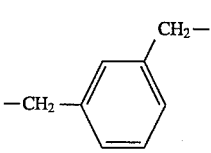 |
| 182 | $-NH-CH_2CH_2-SO_3H$ | 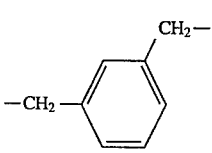 |

TABLE 1-continued
| Ex. | $V_1$ | $B_1$ |
|---|---|---|
| 183 | $-\underset{\underset{CH_3}{|}}{N}-CH_2CH_2-SO_3H$ | 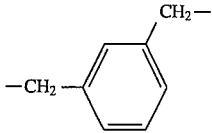 |
| 184 | $-NH_2$ | 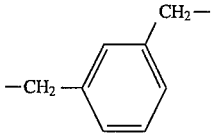 |
| 185 | $-NH-CH_2CH_2-OH$ | 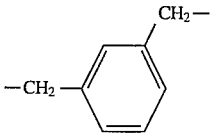 |
| 186 | $-\underset{\underset{CH_3}{|}}{N}-CH_2CH_2-OH$ | 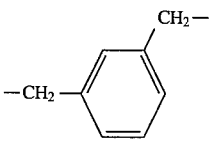 |
| 187 | $-NH-CH_2CH_2-OCH_3$ | 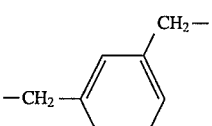 |
| 188 | $-NH-CH_2CH_2-O-CH_2CH_2-OH$ | 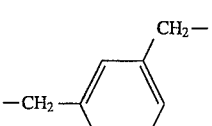 |
| 189 | $-\underset{\underset{CH_2CH_2-OH}{|}}{N}-CH_2CH_2-OH$ | 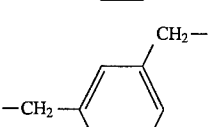 |
| 190 | 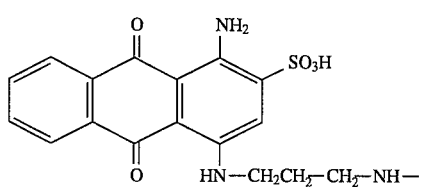 | 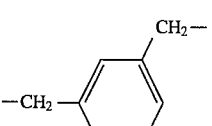 |
| 191 | 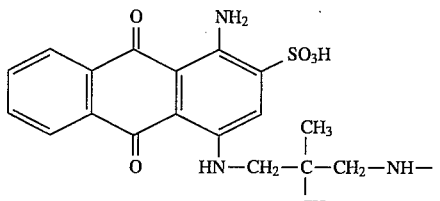 | 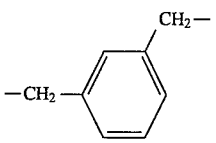 |
| 192 | 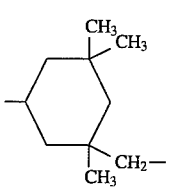 | |

TABLE 1-continued
| Ex. | V₁ | B₁ |
|---|---|---|
| 193 | 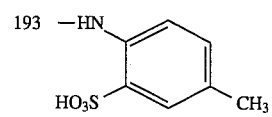 | 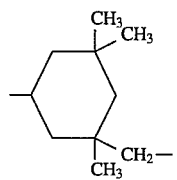 |
| 194 | 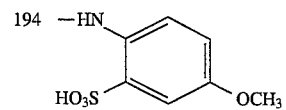 | 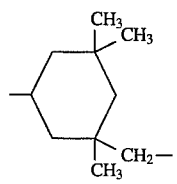 |
| 195 | 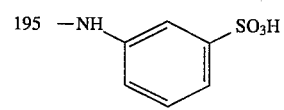 | 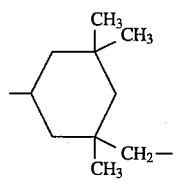 |
| 196 | 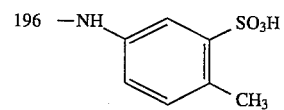 | 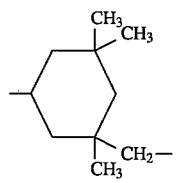 |
| 197 | 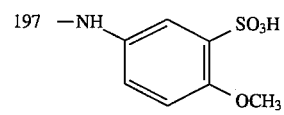 | 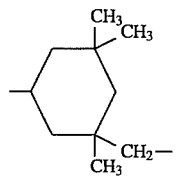 |
| 198 | 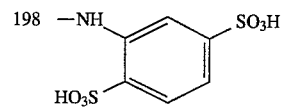 | 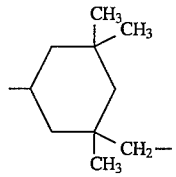 |
| 199 | 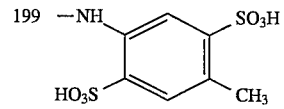 | 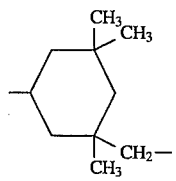 |
| 200 | 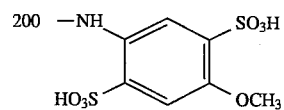 | 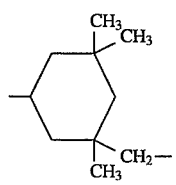 |

TABLE 1-continued

| Ex. | V$_1$ | B$_1$ |
|---|---|---|
| 201 | —NH—C$_6$H$_4$—SO$_3$H (para) | 3,3,5,5-tetramethylcyclohexyl-CH$_2$— |
| 202 | —NH—C$_6$H$_3$(SO$_3$H)$_2$ (2-NH, 3-SO$_3$H, 5-SO$_3$H... HO$_3$S ortho, SO$_3$H para) | 3,3,5,5-tetramethylcyclohexyl-CH$_2$— |
| 203 | —NH-(2-naphthyl)-1-SO$_3$H | 3,3,5,5-tetramethylcyclohexyl-CH$_2$— |
| 204 | —NH-(2-naphthyl)-1,5-(SO$_3$H)$_2$ | 3,3,5,5-tetramethylcyclohexyl-CH$_2$— |
| 205 | —NH-(3-naphthyl)-1,5-(SO$_3$H)$_2$ | 3,3,5,5-tetramethylcyclohexyl-CH$_2$— |
| 206 | —NH-(7-naphthyl)-1,3-(SO$_3$H)$_2$ | 3,3,5,5-tetramethylcyclohexyl-CH$_2$— |
| 207 | —NH-naphthyl-1,3-(SO$_3$H)$_2$, 6-SO$_3$H | 3,3,5,5-tetramethylcyclohexyl-CH$_2$— |
| 208 | —NH—C$_6$H$_3$(SO$_3$H)(SO$_2$—CH$_2$CH$_2$—OSO$_3$H) | 3,3,5,5-tetramethylcyclohexyl-CH$_2$— |

TABLE 1-continued

| Ex. | V$_1$ | B$_1$ |
|---|---|---|
| 209 | −NH−(2-SO$_3$H, 5-SO$_2$−CH=CH$_2$)−C$_6$H$_3$ | 3,3,5-trimethylcyclohexyl-CH$_2$− (1,1,3-trimethyl isomer) |
| 210 | −NH−(2-SO$_3$H, 4-SO$_2$−CH$_2$CH$_2$−OSO$_3$H)−C$_6$H$_3$ | 3,3,5-trimethylcyclohexyl-CH$_2$− |
| 211 | −NH−(2-SO$_3$H, 4-SO$_2$−CH=CH$_2$)−C$_6$H$_3$ | 3,3,5-trimethylcyclohexyl-CH$_2$− |
| 212 | −NH−(2-SO$_3$H, 4-C(=O)−NH−(CH$_2$)$_2$−SO$_2$−(CH$_2$)$_2$−OSO$_3$H)−C$_6$H$_3$ | 3,3,5-trimethylcyclohexyl-CH$_2$− |
| 213 | −NH−(2-SO$_3$H, 4-C(=O)−NH−(CH$_2$)$_2$−SO$_2$−CH=CH$_2$)−C$_6$H$_3$ | 3,3,5-trimethylcyclohexyl-CH$_2$− |
| 214 | −NH−(3-SO$_3$H, 4-C(=O)−NH−(CH$_2$)$_2$−SO$_2$−(CH$_2$)$_2$−OSO$_3$H)−C$_6$H$_3$ | 3,3,5-trimethylcyclohexyl-CH$_2$− |
| 215 | −NH−(3-SO$_3$H, 4-C(=O)−NH−(CH$_2$)$_2$−SO$_2$−CH=CH$_2$)−C$_6$H$_3$ | 3,3,5-trimethylcyclohexyl-CH$_2$− |
| 216 | −NH−(2-SO$_3$H, 5-HN−C(=O)−CHBr−CH$_2$−Br)−C$_6$H$_3$ | 3,3,5-trimethylcyclohexyl-CH$_2$− |

TABLE 1-continued
| Ex. | V₁ | B₁ |
|---|---|---|
| 217 | 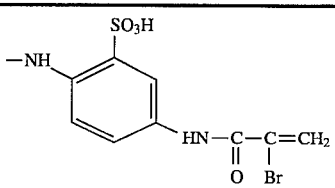 | 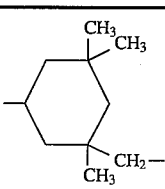 |
| 218 | 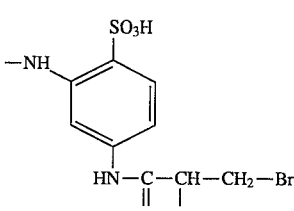 | 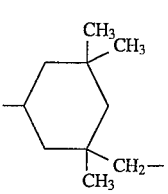 |
| 219 | 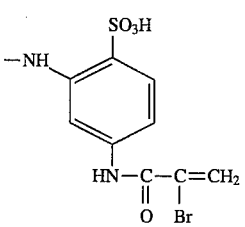 | 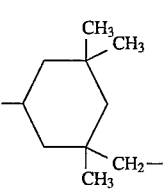 |
| 220 | $-NH-CH_2CH_2-SO_3H$ | 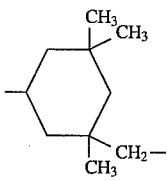 |
| 221 | $-N-CH_2CH_2-SO_3H$<br>$\quad\vert$<br>$\quad CH_3$ | 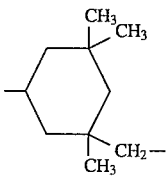 |
| 222 | $-NH_2$ | 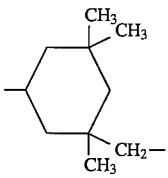 |
| 223 | $-NH-CH_2CH_2-OH$ | 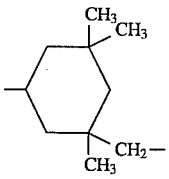 |
| 224 | $-N-CH_2CH_2-OH$<br>$\quad\vert$<br>$\quad CH_3$ | 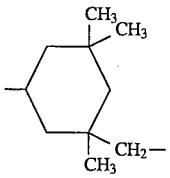 |

TABLE 1-continued
| Ex. | V$_1$ | B$_1$ |
|---|---|---|
| 225 | —NH—CH$_2$CH$_2$—OCH$_3$ | 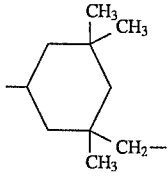 |
| 226 | —NH—CH$_2$CH$_2$—O—CH$_2$CH$_2$—OH | 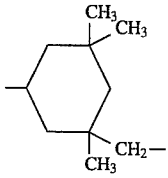 |
| 227 | —N(—CH$_2$CH$_2$—OH)—CH$_2$CH$_2$—OH | 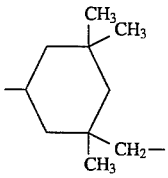 |
| 228 | 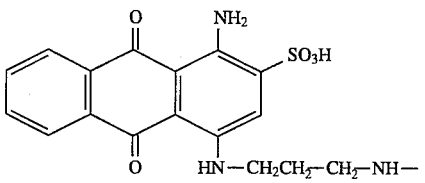 | 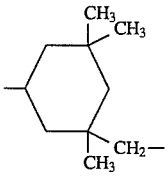 |
| 229 | 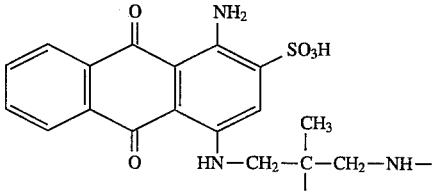 | 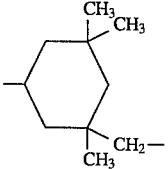 |
| 230 | 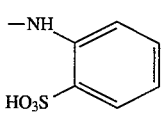 | —(CH$_2$)$_3$—O—(CH$_2$)$_4$—O—(CH$_2$)$_3$— |
| 231 | 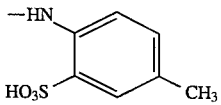 | —(CH$_2$)$_3$—O—(CH$_2$)$_4$—O—(CH$_2$)$_3$— |
| 232 | 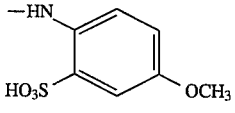 | —(CH$_2$)$_3$—O—(CH$_2$)$_4$—O—(CH$_2$)$_3$— |
| 233 | 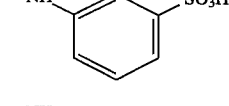 | —(CH$_2$)$_3$—O—(CH$_2$)$_4$—O—(CH$_2$)$_3$— |
| 234 | 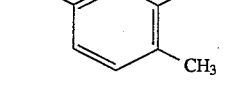 | —(CH$_2$)$_3$—O—(CH$_2$)$_4$—O—(CH$_2$)$_3$— |

TABLE 1-continued

| Ex. | $V_1$ | $B_1$ |
|---|---|---|
| 235 | $-NH-$ (phenyl with $SO_3H$, $OCH_3$) | $-(CH_2)_3-O-(CH_2)_4-O-(CH_2)_3-$ |
| 236 | $-NH-$ (phenyl with $SO_3H$, $HO_3S$) | $-(CH_2)_3-O-(CH_2)_4-O-(CH_2)_3-$ |
| 237 | $-NH-$ (phenyl with $SO_3H$, $HO_3S$, $CH_3$) | $-(CH_2)_3-O-(CH_2)_4-O-(CH_2)_3-$ |
| 238 | $-NH-$ (phenyl with $SO_3H$, $HO_3S$, $OCH_3$) | $-(CH_2)_3-O-(CH_2)_4-O-(CH_2)_3-$ |
| 239 | $-NH-$ (phenyl with $SO_3H$) | $-(CH_2)_3-O-(CH_2)_4-O-(CH_2)_3-$ |
| 240 | $-NH-$ (phenyl with $HO_3S$, $SO_3H$) | $-(CH_2)_3-O-(CH_2)_4-O-(CH_2)_3-$ |
| 241 | $-NH-$ (naphthyl with $SO_3H$) | $-(CH_2)_3-O-(CH_2)_4-O-(CH_2)_3-$ |
| 242 | $-NH-$ (naphthyl with two $SO_3H$) | $-(CH_2)_3-O-(CH_2)_4-O-(CH_2)_3-$ |
| 243 | $-NH-$ (naphthyl with $SO_3H$, $SO_3H$) | $-(CH_2)_3-O-(CH_2)_4-O-(CH_2)_3-$ |
| 244 | $-NH-$ (naphthyl with $SO_3H$, $SO_3H$) | $-(CH_2)_3-O-(CH_2)_4-O-(CH_2)_3-$ |
| 245 | $-NH-$ (naphthyl with $SO_3H$, $HO_3S$, $SO_3H$) | $-(CH_2)_3-O-(CH_2)_4-O-(CH_2)_3-$ |

TABLE 1-continued

| Ex. | V₁ | B₁ |
|---|---|---|
| 246 | 4-NH-, 3-SO₃H, 5-(SO₂—CH₂CH₂—OSO₃H)-phenyl | —(CH₂)₃—O—(CH₂)₄—O—(CH₂)₃— |
| 247 | 4-NH-, 3-SO₃H, 5-(SO₂—CH=CH₂)-phenyl | —(CH₂)₃—O—(CH₂)₄—O—(CH₂)₃— |
| 248 | 2-NH-, 1-SO₃H, 4-(SO₂—CH₂CH₂—OSO₃H)-phenyl | —(CH₂)₃—O—(CH₂)₄—O—(CH₂)₃— |
| 249 | 2-NH-, 1-SO₃H, 4-(SO₂—CH=CH₂)-phenyl | —(CH₂)₃—O—(CH₂)₄—O—(CH₂)₃— |
| 250 | 4-NH-, 3-SO₃H, 1-(C(O)—NH—(CH₂)₂—SO₂—(CH₂)₂—OSO₃H)-phenyl | —(CH₂)₃—O—(CH₂)₄—O—(CH₂)₃— |
| 251 | 4-NH-, 3-SO₃H, 1-(C(O)—NH—(CH₂)₂—SO₂—CH=CH₂)-phenyl | —(CH₂)₃—O—(CH₂)₄—O—(CH₂)₃— |
| 252 | 4-NH-, 3-SO₃H (NH adjacent), 1-(C(O)—NH—(CH₂)₂—SO₂—(CH₂)₂—OSO₃H)-phenyl | —(CH₂)₃—O—(CH₂)₄—O—(CH₂)₃— |
| 253 | 4-NH-, 3-SO₃H (NH adjacent), 1-(C(O)—NH—(CH₂)₂—SO₂—CH=CH₂)-phenyl | —(CH₂)₃—O—(CH₂)₄—O—(CH₂)₃— |

TABLE 1-continued
| Ex. | $V_1$ | $B_1$ |
|---|---|---|
| 254 | 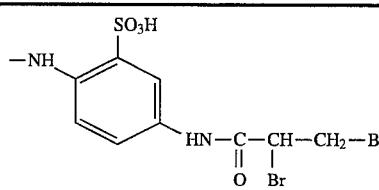 | $-(CH_2)_3-O-(CH_2)_4-O-(CH_2)_3-$ |
| 255 | 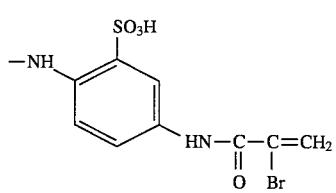 | $-(CH_2)_3-O-(CH_2)_4-O-(CH_2)_3-$ |
| 256 | 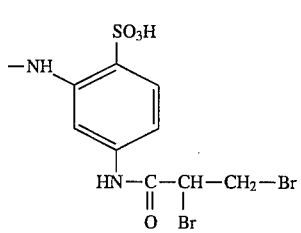 | $-(CH_2)_3-O-(CH_2)_4-O-(CH_2)_3-$ |
| 257 | 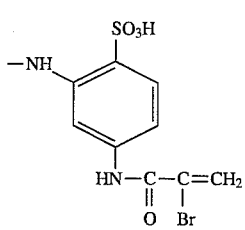 | $-(CH_2)_3-O-(CH_2)_4-O-(CH_2)_3-$ |
| 258 | $-NH-CH_2CH_2-SO_3H$ | $-(CH_2)_3-O-(CH_2)_4-O-(CH_2)_3-$ |
| 259 | $-N(CH_3)-CH_2CH_2-SO_3H$ | $-(CH_2)_3-O-(CH_2)_4-O-(CH_2)_3-$ |
| 260 | $-NH_2$ | $-(CH_2)_3-O-(CH_2)_4-O-(CH_2)_3-$ |
| 261 | $-NH-CH_2CH_2-OH$ | $-(CH_2)_3-O-(CH_2)_4-O-(CH_2)_3-$ |
| 262 | $-N(CH_3)-CH_2CH_2-OH$ | $-(CH_2)_3-O-(CH_2)_4-O-(CH_2)_3-$ |
| 263 | $-NH-CH_2CH_2-OCH_3$ | $-(CH_2)_3-O-(CH_2)_4-O-(CH_2)_3-$ |
| 264 | $-NH-CH_2CH_2-O-CH_2CH_2-OH$ | $-(CH_2)_3-O-(CH_2)_4-O-(CH_2)_3-$ |
| 265 | $-N(CH_2CH_2-OH)-CH_2CH_2-OH$ | $-(CH_2)_3-O-(CH_2)_4-O-(CH_2)_3-$ |
| 266 | 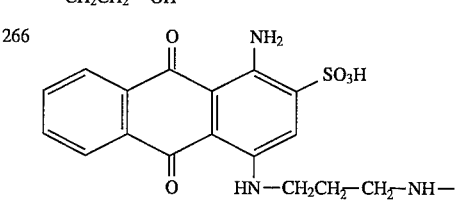 | $-(CH_2)_3-O-(CH_2)_4-O-(CH_2)_3-$ |

TABLE 1-continued
| Ex. | $V_1$ | $B_1$ |
|---|---|---|
| 267 | 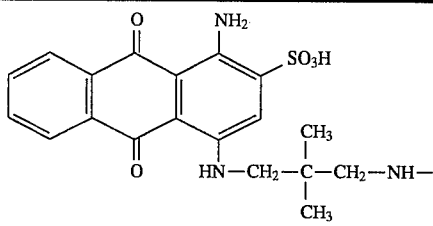 | $-(CH_2)_3-O-(CH_2)_4-O-(CH_2)_3-$ |
| 268 | 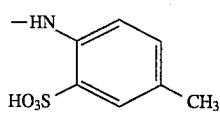 | $-(CH_2)_3-$ |
| 269 | 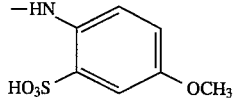 | $-(CH_2)_3-$ |
| 270 | 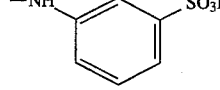 | $-(CH_2)_3-$ |
| 271 | 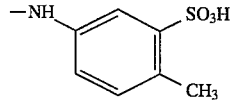 | $-(CH_2)_3-$ |
| 272 | 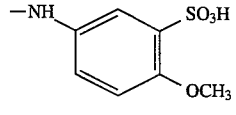 | $-(CH_2)_3-$ |
| 273 | 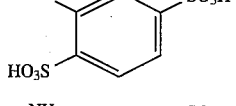 | $-(CH_2)_3-$ |
| 274 | 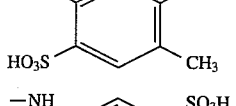 | $-(CH_2)_3-$ |
| 275 | 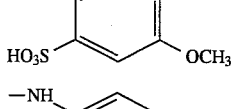 | $-(CH_2)_3-$ |
| 276 | 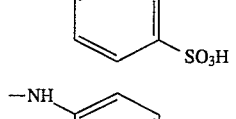 | $-(CH_2)_3-$ |
| 277 | 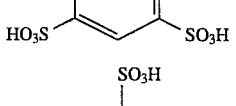 | $-(CH_2)_3-$ |
| 278 | 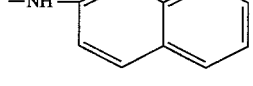 | $-(CH_2)_3-$ |

TABLE 1-continued
| Ex. | V₁ | B₁ |
|---|---|---|
| 279 | 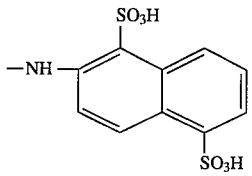 | —(CH₂)₃— |
| 280 | 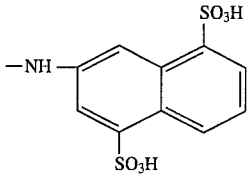 | —(CH₂)₃— |
| 281 | 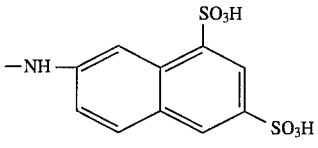 | —(CH₂)₃— |
| 282 | 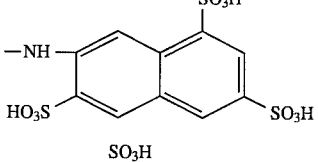 | —(CH₂)₃— |
| 283 | 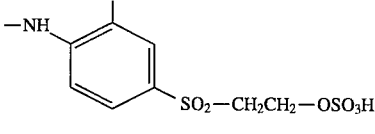 | —(CH₂)₃— |
| 284 | 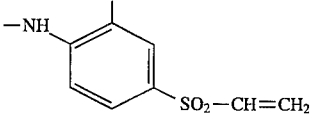 | —(CH₂)₃— |
| 285 | 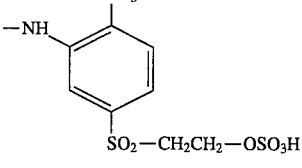 | —(CH₂)₃— |
| 286 | 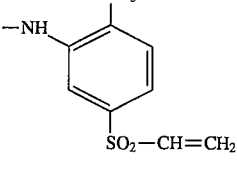 | —(CH₂)₃— |
| 287 | 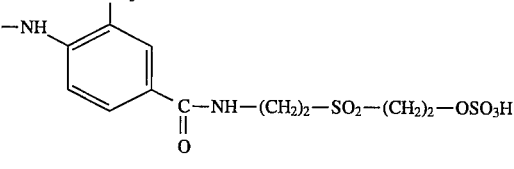 | —(CH₂)₃— |

TABLE 1-continued

| Ex. | V₁ | B₁ |
|---|---|---|
| 288 | 4-NH-, 3-SO₃H phenyl-C(O)-NH-(CH₂)₂-SO₂-CH=CH₂ | -(CH₂)₃- |
| 289 | 4-NH-, 3-SO₃H phenyl-C(O)-NH-(CH₂)₂-SO₂-(CH₂)₂-OSO₃H | -(CH₂)₃- |
| 290 | 4-NH-, 3-SO₃H phenyl-C(O)-NH-(CH₂)₂-SO₂-CH=CH₂ | -(CH₂)₃- |
| 291 | 4-NH-, 3-SO₃H phenyl-NH-C(O)-CH(Br)-CH₂-Br | -(CH₂)₃- |
| 292 | 4-NH-, 3-SO₃H phenyl-NH-C(O)-C(Br)=CH₂ | -(CH₂)₃- |
| 293 | 4-NH-, 3-SO₃H phenyl-NH-C(O)-CH(Br)-CH₂-Br | -(CH₂)₃- |
| 294 | 4-NH-, 3-SO₃H phenyl-NH-C(O)-C(Br)=CH₂ | -(CH₂)₃- |
| 295 | -NH-CH₂CH₂-SO₃H | -(CH₂)₃- |
| 296 | -N(CH₃)-CH₂CH₂-SO₃H | -(CH₂)₃- |
| 297 | -NH₂ | -(CH₂)₃- |

TABLE 1-continued

| Ex. | $V_1$ | $B_1$ |
|---|---|---|
| 298 | $-NH-CH_2CH_2-OH$ | $-(CH_2)_3-$ |
| 299 | $-N(CH_3)-CH_2CH_2-OH$ | $-(CH_2)_3-$ |
| 300 | $-NH-CH_2CH_2-OCH_3$ | $-(CH_2)_3-$ |
| 301 | $-NH-CH_2CH_2-O-CH_2CH_2-OH$ | $-(CH_2)_3-$ |
| 302 | $-N(CH_2CH_2-OH)-CH_2CH_2-OH$ | $-(CH_2)_3-$ |
| 303 | 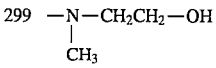 | $-(CH_2)_3-$ |
| 304 | 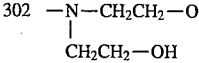 | $-(CH_2)_3-$ |
| 305 | 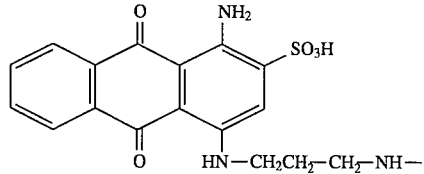 | $-(CH_2)_6-$ |

Following the procedure of Example 1 but using instead of 38 parts of 1-amino-4-(3-aminopropyl)anthraquinone-2-sulfonic acid, an equimolar quantity of an anthraquinone compound of the formula

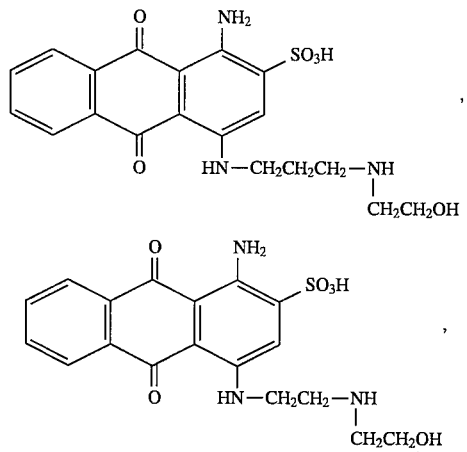

gives analogous dyes which dye cotton and wool in blue shades.

Following the procedure indicated in one of Examples 1 to 305 but using, instead of 19 parts of 2,4-diaminobenzenesulfonic acid, an equimolar quantity of 2,5-diaminobenzenesulfonic acid, 2,4-diaminobenzene-1,5-disulfonic acid or 2,5-diaminobenzene-1,4-disulfonic acid gives analogous dyes which dye cotton and wool in blue shades.

EXAMPLE 306

By a procedure similar to that indicated in Example 2, the dye of the formula

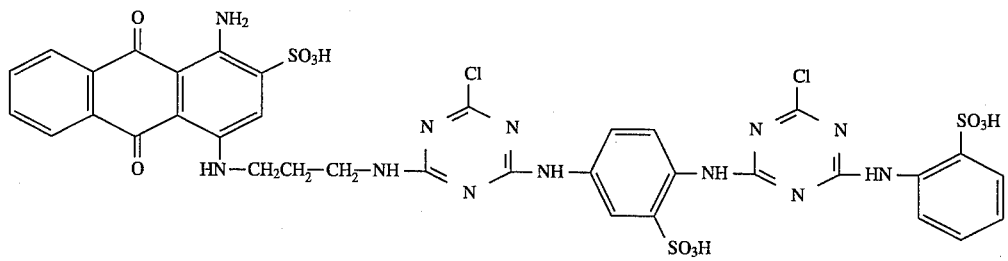
(105)

can be obtained. The dye of the formula (105) dyes cotton and wool in blue shades.

EXAMPLE 307

13 pans of cyanuric fluoride are added dropwise at a temperature of 0° C. to a solution of 17 parts of 2-aminobenzenesulfonic acid in 250 parts of water, which has been rendered neutral with sodium hydroxide solution and is buffered with 5 parts of disodium hydrogen phosphate. During this dropwise addition, the pH is held constant at a value of 7 by addition of sodium hydroxide solution. After the end of the reaction, a solution of 19 pans of 2,4-diaminobenzenesulfonic acid in 150 pans of water, rendered neutral with sodium hydroxide solution, is added dropwise, the pH being held constant at a value of 7 by addition of sodium hydroxide solution. When starting material can no longer be detected by thin-layer chromatography, 13 parts of cyanuric fluoride are added dropwise, the pH being held at a value of 7 by addition of sodium hydroxide solution.

To the solution thus obtained is added dropwise a further solution of 38 parts of 1-amino-4-(3-aminopropyl)anthraquinone-2-sulfonic acid, dissolved with 4 parts of lithium hydroxide monohydrate in 380 parts of water, at a rate such that the pH does not exceed a value of 10. The pH is subsequently held at a value of 9.5 until the end of the reaction. Following neutralization, the sodium chloride formed is removed by dialysis and the dye solution is concentrated by evaporation in vacuo. A dye is obtained which in the form of the free acid corresponds to the compound of the formula

EXAMPLE 308

13 parts of cyanuric fluoride are added dropwise at a temperature of 0° C. to a solution of 19 parts of 2,4-diaminobenzenesulfonic acid in 150 parts of water, which has been rendered neutral with sodium hydroxide solution and is buffered with 5 parts of disodium hydrogen phosphate. During this dropwise addition, the pH is held constant at a value of 5 by addition of sodium hydroxide solution. After the end of the reaction, the resulting solution is added dropwise to a solution of 38 parts of 1-amino-4-(3-aminopropyl)anthraquinone-2-sulfonic acid, dissolved with 4 parts of lithium hydroxide monohydrate in 380 parts of water, at a rate such that the pH does not exceed a value of 9. The pH is subsequently held at a value of 8.5 until the end of the reaction (solution 1).

13 parts of cyanuric fluoride are added dropwise at a temperature of 0° C. to a solution of 17 parts of 2-aminobenzenesulfonic acid in 250 parts of water, which has been rendered neutral with sodium hydroxide solution and is buffered with 5 parts of disodium hydrogen phosphate. During this dropwise addition, the pH is held constant at a value of 7 by addition of sodium hydroxide solution. The solution 1 obtainable as indicated above is subsequently added dropwise at a rate such that the pH does not exceed a value of 7. The pH is then held at the value of 7 by adding sodium hydroxide solution. After the end of the reaction, the sodium chloride formed is removed by dialysis and the dye solution is concentrated by evaporation in vacuo. A dye is obtained which in the form a free acid corresponds to the compound of the formula

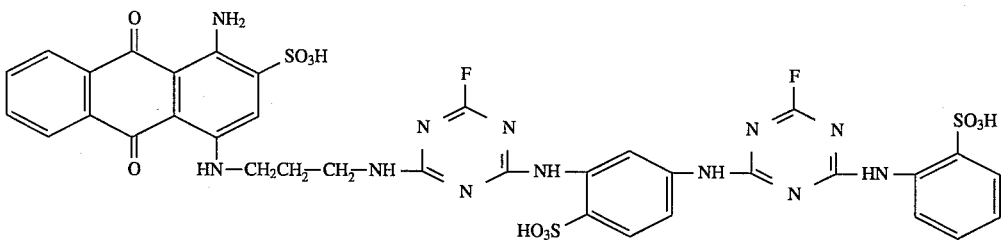
(106)

The dye of the formula (106) dyes cotton and wool in blue shades.

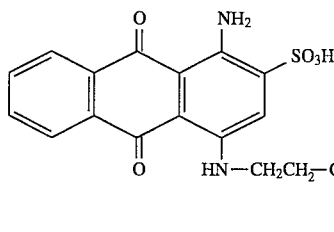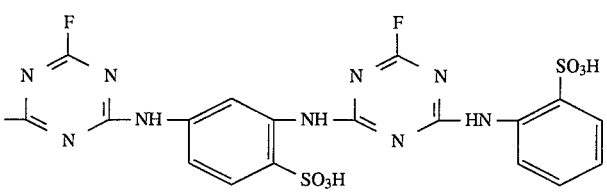

(107)

The dye of the formula (107) dyes cotton and wool in blue shades.

Following the procedure of Example 307 or of Example 308 but using, instead of 17 parts of 2-aminobenzenesulfonic acid, an equimolar quantity of an amine of the formula H-$V_1$, and, instead of 38 parts of 1-amino-4-(3-aminopropyl)anthraquinone-2-sulfonic acid, an equimolar quantity of an anthraquinone compound of the formula (103), where $B_1$ and $V_1$ are in each case as defined in Examples 3 to 305 of Table 1, gives dyes of the general formula

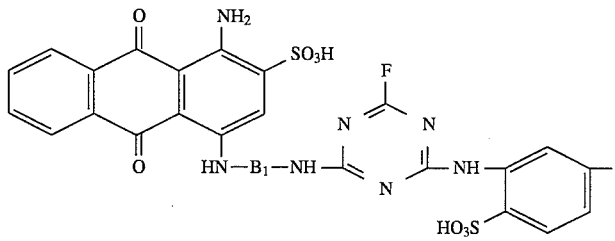

(108a)

or

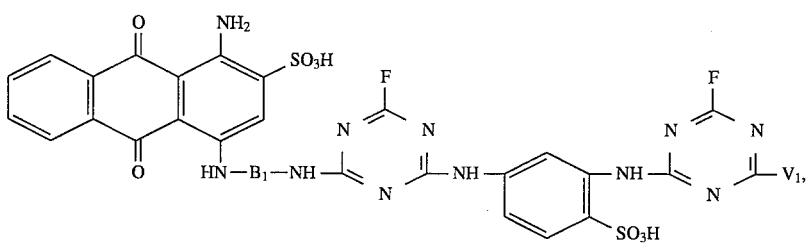

(108b)

respectively, in which $B_1$ and $V_1$ are in each case as defined in Examples 3 to 305 of Table 1, and which dye cotton and wool in blue shades.

Analogous dyes are obtained using, instead of 19 parts of 2,4-diaminobenzenesulfonic acid, an equimolar quantity of 2,5-diaminobenzenesulfonic acid, 2,4-diaminobenzene-1,5-disulfonic acid or 2,5-diaminobenzene-1,4-disulfonic acid.

EXAMPLE 309

Following the procedure indicated in Example 308, the dye of the formula

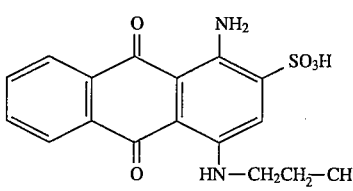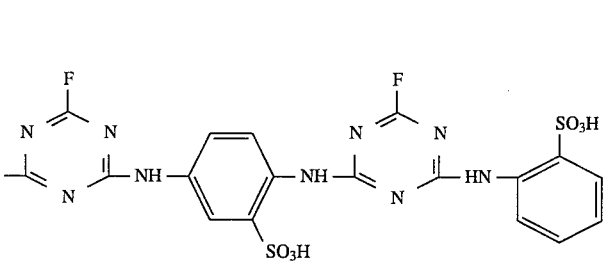

(109)

can be obtained. The dye of the formula (109) dyes cotton and wool in blue shades.

EXAMPLE 310

19 parts of cyanuric chloride are stirred vigorously into 50 parts of water, with the addition of a wetting agent and 5 parts of disodium hydrogen phosphate, at a temperature of 0° C. A neutral solution of 32 parts of a compound of the formula

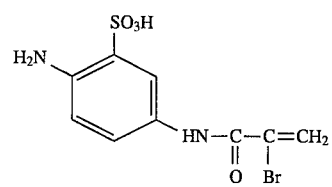

(110)

in 320 parts of water is added. During this addition, the pH is held constant at a value of 4.5 by addition of sodium hydroxide solution. After the end of the reaction, a solution of parts of 1-amino-4-(3-aminopropyl)anthraquinone-2-sulfonic acid, dissolved with 4 parts of lithium hydroxide monohydrate in 380 parts of water, is added dropwise at a rate such that the pH does not exceed a value of 10. The pH is subsequently held at a value of 9.5 until the end of the reaction. The dye is precipitated by addition of sodium chloride, filtered off, washed with aqueous sodium chloride solution and dried. A dye is obtained which in the form of the free acid corresponds to the compound of the formula

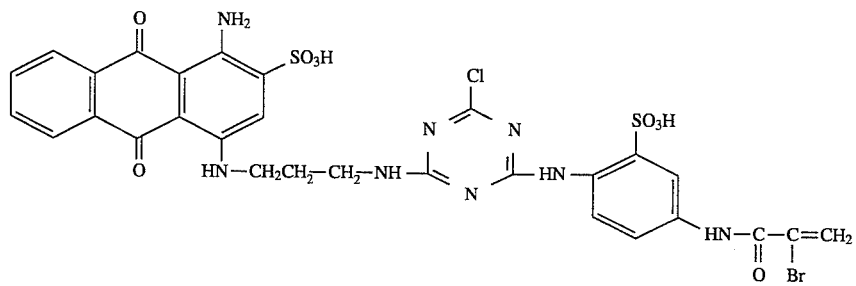

(111)

The dye of the formula (111) dyes cotton and wool in blue shades.

EXAMPLES 311 to 344

Following the procedure of Example 310 but using, instead of 32 parts of a compound of the formula (110), an equimolar quantity of an amine of the formula $H-V_1$, and, instead of 38 parts of 1-amino-4-(3-aminopropyl)anthraquinone-2-sulfonic acid, an equimolar quantity of an anthraquinone compound of the formula

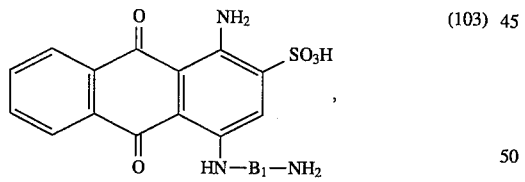

(103)

gives the dyes indicated in Table 2 below of the general formula

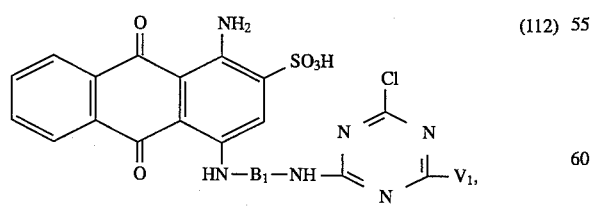

(112)

in which $B_1$ and $V_1$ are in each case as defined in Table 2 below.

The dyes indicated in Table 2 dye cotton and wool in blue shades.

TABLE 2
| Ex. | V₁ | B₁ |
|---|---|---|
| 311 | 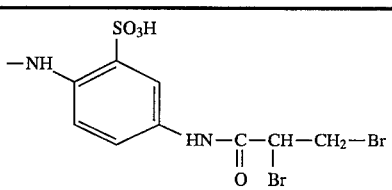 | —(CH$_2$)$_3$— |
| 312 | 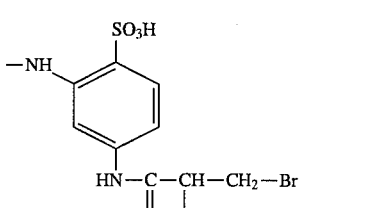 | —(CH$_2$)$_3$— |
| 313 | 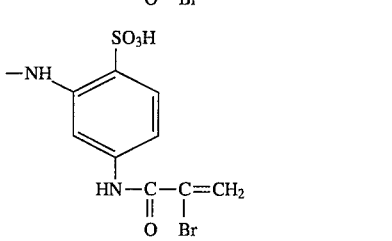 | —(CH$_2$)$_3$— |
| 314 | 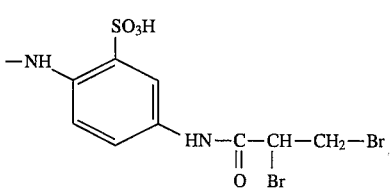 | —(CH$_2$)$_6$— |
| 315 | 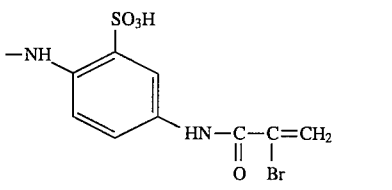 | —(CH$_2$)$_6$— |
| 316 | 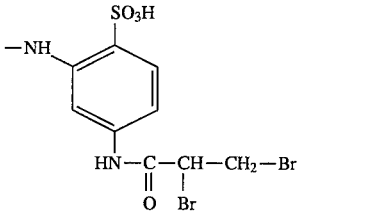 | —(CH$_2$)$_6$— |
| 317 | 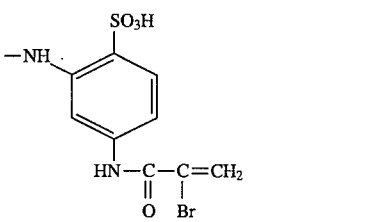 | —(CH$_2$)$_6$— |

TABLE 2-continued

| Ex. | V₁ | B₁ |
|---|---|---|
| 318 | 2-NH-, 3-SO₃H, 5-NHC(O)CH(Br)CH₂Br phenyl | $-(CH_2)_2-O-(CH_2)_2-O-(CH_2)_2-$ |
| 319 | 2-NH-, 3-SO₃H, 5-NHC(O)C(Br)=CH₂ phenyl | $-(CH_2)_2-O-(CH_2)_2-O-(CH_2)_2-$ |
| 320 | 3-NH-, 4-SO₃H, 1-NHC(O)CH(Br)CH₂Br phenyl | $-(CH_2)_2-O-(CH_2)_2-O-(CH_2)_2-$ |
| 321 | 3-NH-, 4-SO₃H, 1-NHC(O)C(Br)=CH₂ phenyl | $-(CH_2)_2-O-(CH_2)_2-O-(CH_2)_2-$ |
| 322 | 2-NH-, 3-SO₃H, 5-NHC(O)CH(Br)CH₂Br phenyl | $-(CH_2)_3-CH(CH_3)-CH_2-$ |
| 323 | 2-NH-, 3-SO₃H, 5-NHC(O)C(Br)=CH₂ phenyl | $-(CH_2)_3-CH(CH_3)-CH_2-$ |
| 324 | 3-NH-, 4-SO₃H, 1-NHC(O)CH(Br)CH₂Br phenyl | $-(CH_2)_3-CH(CH_3)-CH_2-$ |

TABLE 2-continued
| Ex. | V₁ | B₁ |
|---|---|---|
| 325 | 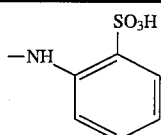 | —(CH₂)₃—CH(CH₃)—CH₂— |
| 326 | 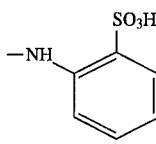 | —CH₂—C(CH₃)₂—CH₂— |
| 327 | 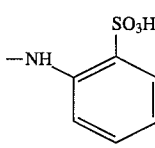 | —CH₂—C(CH₃)₂—CH₂— |
| 328 | 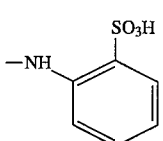 | —CH₂—C(CH₃)₂—CH₂— |
| 329 | 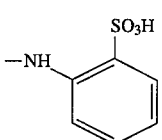 | —CH₂—C(CH₃)₂—CH₂— |
| 330 | 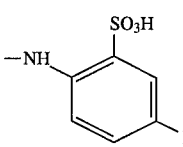 | 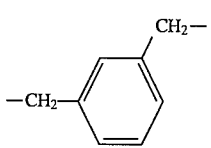 |
| 331 | 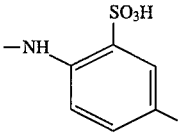 | 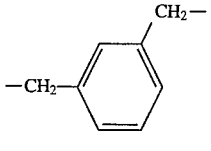 |

TABLE 2-continued
| Ex. | V₁ | B₁ |
|---|---|---|
| 332 | 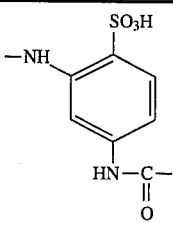 | 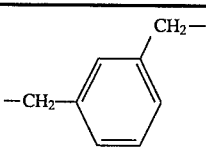 |
| 333 | 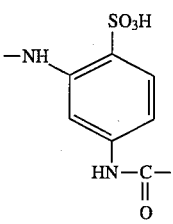 | 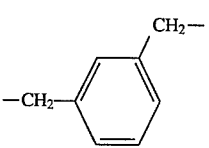 |
| 334 | 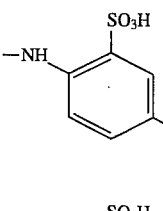 | 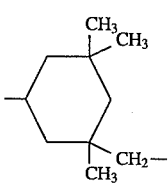 |
| 335 | 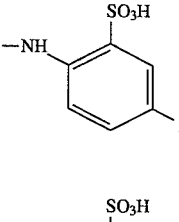 | 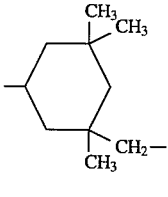 |
| 336 | 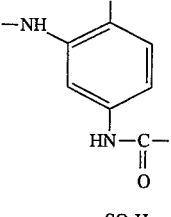 | 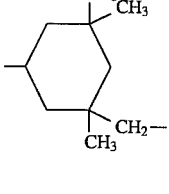 |
| 337 | 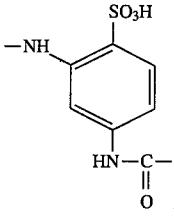 | 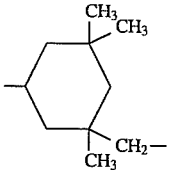 |
| 338 | 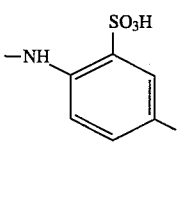 | $-(CH_2)_3-O-(CH_2)_4-O-(CH_2)_3-$ |

TABLE 2-continued
| Ex. | V₁ | B₁ |
|---|---|---|
| 339 | 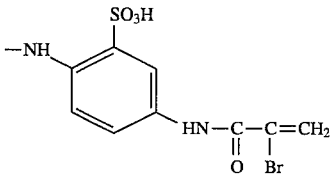 | —(CH₂)₃—O—(CH₂)₄—O—(CH₂)₃— |
| 340 | 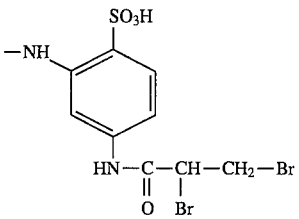 | —(CH₂)₃—O—(CH₂)₄—O—(CH₂)₃— |
| 341 | 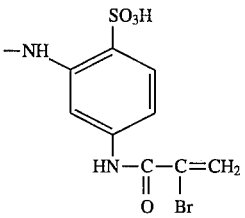 | —(CH₂)₃—O—(CH₂)₄—O—(CH₂)₃— |
| 342 | 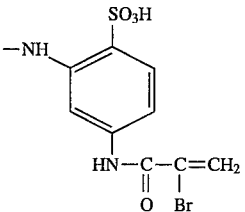 | —CH₂—CH₂—CH(C₂H₅)— |
| 343 | 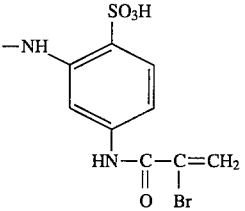 | —CH₂—CH(OH)—CH₂— |
| 344 | 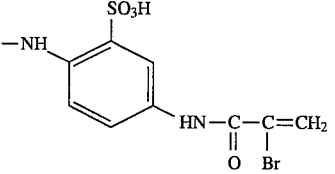 | —CH₂—CH(OH)—CH₂— |
Following the procedure of Example 310 but using, instead of 38 parts of 1-amino-4-(3-aminopropyl)anthraquinone-2-sulfonic acid, an eqimolar quantity of an anthraquinone compound of the formula

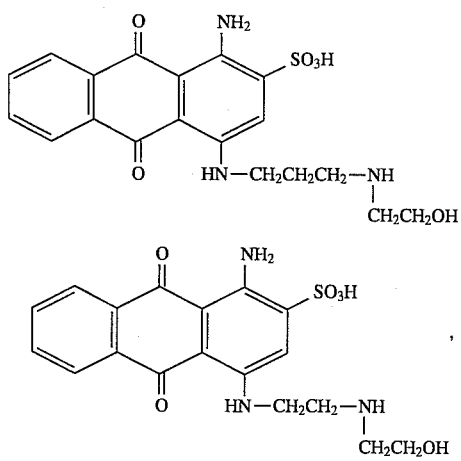

gives analogous dyes which dye cotton and wool in blue shades.

EXAMPLE 345

13 parts of cyanuric fluoride are added dropwise at a temperature of 0° C. to a solution of 32 parts of a compound of the formula

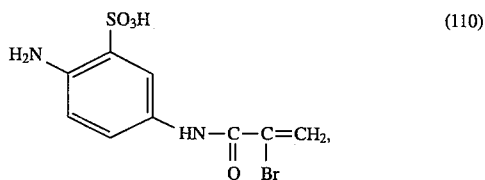

in 320 parts of water, which has been rendered neutral with sodium hydroxide solution and is buffered with 5 parts of disodium hydrogen phosphate. During this dropwise addition, the pH is held constant at a value of 7 by addition of sodium hydroxide solution. After the end of the reaction, a solution of 38 parts of 1-amino-4-(3-aminopropyl)anthraquinone-2-sulfonic acid, dissolved with 4 parts of lithium hydroxide monohydrate in 380 parts of water, is added dropwise at a rate such that the pH does not exceed a value of 10. The pH is subsequently held at a value of 9.5 until the end of the reaction. The dye is precipitated by addition of sodium chloride, filtered off, washed with aqueous sodium chloride solution and dried. A dye is obtained which in the form of the free acid corresponds to the compound of the formula instead of 38 parts of 1-amino-4-(3-aminopropyl)anthraquinone-2-sulfonic acid, an equimolar quantity of an anthraquinone compound of the formula (103) in which $B_1$ and $V_1$ are in each case as defined in Examples 311 to 344 of Table 2, gives dyes of the general formula

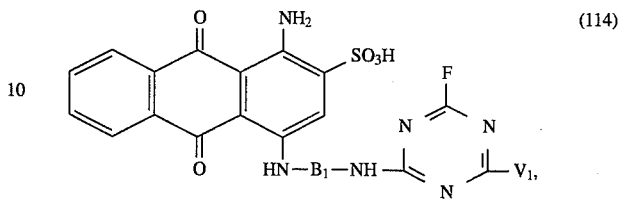

in which $B_1$ and $V_1$ are in each case as defined in Examples 311 to 344 of Table 2 and which dye cotton and wool in blue shades.

In the examples in which a product containing a β-sulfatoethylsulfonyl group or α,β-dibromopropionylamino group is reacted with an anthraquinone compound, this reaction is carded out in a relatively dilute medium at a pH of about 8.5.

Dyeing method 2 parts of the reactive dye obtained according to Example 1 are dissolved in 400 parts of water; 1500 parts of a solution containing 53 g of sodium chloride per liter are added. This dyebath is entered at 40° C. with 100 parts of cotton fabric. After 45 minutes 100 parts of a solution containing 16 g of sodium hydroxide and 20 g of calcined sodium carbonate per liter are added. The temperature of the dyebath is held at 40° C. for a further 45 minutes. Then the dyed fabric is rinsed, soaped off at the boil for a quarter of an hour with a nonionic detergent, rinsed once more and dried.

Printing method 3 parts of the reactive dye obtained according to Example 1 are sprinkled with rapid stirring into 100 parts of a stock thickening containing 50 parts of 5% sodium alginate thickening, 27.8 parts of water, 20 parts of urea, 1 part of sodium m-nitrobenzenesulfonate and 1.2 parts of sodium hydrogen carbonate. The resulting print paste is used to print a cotton fabric, which is then dried and steamed at 102° C. in saturated steam for 2 minutes. The printed fabric is then rinsed, soaped off at the boil if desired and rinsed once more, and subsequently dried.

What is claimed is:

1. An anthraquinone dye of the formula

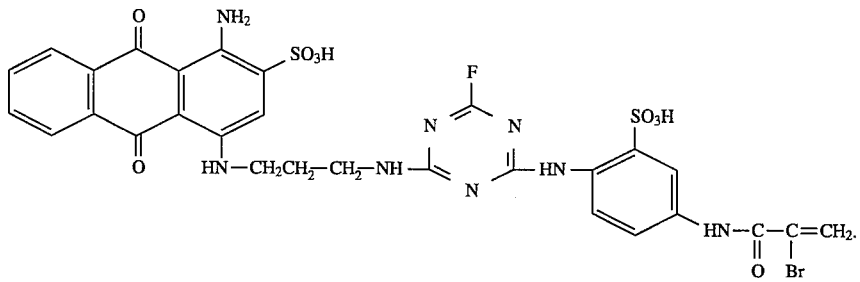

The dye of the formula (113) dyes cotton and wool in blue shades.

Following the procedure of Example 345 but using, instead of 32 parts of a compound of the formula (110), an equimolar quantity of an amine of the formula H-$V_1$, and, $$\text{(1)}$$

[Structure showing anthraquinone with NH₂, SO₃H, and substituted side chain containing N-B₁-N with R₁, R₂ groups and triazine ring with X₁]

$$\left[ -N-B_2-N \underset{R_4}{\overset{}{|}} \underset{}{\overset{X_2}{\underset{N}{\overset{}{\bigg|}}}} N-\underset{R_5}{\overset{}{|}} Y \right]_m \quad (1)$$

in which $R_1$, $R_2$, $R_3$, $R_4$ and $R_5$ independently of one another are hydrogen or are substituted or unsubstituted $C_1$–$C_{12}$alkyl, $X_1$ and $X_2$ independently of one another are chlorine or fluorine, $B_1$ is a $C_2$–$C_{12}$alkylene radical which is unsubstituted or substituted by hydroxyl, sulfo or sulfato and is uninterrupted or is interrupted by oxygen; or is a cyclohexylene radical, $C_1$–$C_4$alkylene-cyclohexylene radical, cyclohexylene-$C_1$–$C_4$alkylene radical, $C_1$–$C_4$alkylene-cyclohexylene-$C_1$–$C_4$alkylene radical or cyclohexylene-methylene-cyclohexylene radical which is unsubstituted or is substituted in the cyclohexylene ring by $C_1$–$C_4$alkyl; or is a $C_1$–$C_4$alkylene-phenylene radical, phenylene-$C_1$–$C_4$alkylene radical or $C_1$–$C_4$alkylene-phenylene-$C_1$–$C_4$alkylene radical which is unsubstituted or is substituted in the phenylene ring by $C_1$–$C_4$alkyl, $C_1$–$C_4$alkoxy, $C_2$–$C_4$alkanoylamino, sulfo, halogen or carboxyl, $B_2$ is an aromatic bridge member, Y is hydrogen, $C_1$–$C_{12}$alkyl which is unsubstituted or is substituted by hydroxyl, sulfo or sulfato and which $C_1$–$C_{12}$alkyl, with the exception of methyl, is uninterrupted or is interrupted by oxygen, or Y is phenyl or naphthyl each of which is unsubstituted or substituted by $C_1$–$C_4$alkyl, $C_1$–$C_4$-alkoxy, $C_2$–$C_4$alkanoylamino, halogen, sulfo, carboxyl or a fibre-reactive group, and m is the number 0 or 1, with the proviso that, if m is the number 0, the radical Y is phenyl or naphthyl as defined above and the radical Y contains a fibre-reactive group of the formula $$-\underset{R'}{\overset{}{|}}N-CO-\underset{Hal}{\overset{}{|}}CH-CH_2\text{-}Hal \quad (2a)$$

or $$-\underset{R'}{\overset{}{|}}N-CO-\underset{Hal}{\overset{}{|}}C=CH_2, \quad (2b)$$

in which Hal is halogen and R' is hydrogen or $C_1$–$C_4$alkyl.

2. An anthraquinone dye according to claim 1, in which $R_1$, $R_2$, $R_3$ and $R_4$ are hydrogen or $C_1$–$C_4$alkyl and $R_5$ is hydrogen or is $C_1$–$C_8$alkyl which is unsubstituted or is substituted by hydroxyl, sulfo or sulfato and, with the exception of methyl, is uninterrupted or is interrupted by oxygen.

3. An anthraquinone dye according to claim 1, in which $B_1$ is $C_2$–$C_2$alkylene which is uninterrupted or is interrupted by oxygen; or is a methylene-cyclohexylene radical, cyclohexylene-methylene radical or cyclohexylene-methylene-cyclohexylene radical which is unsubstituted or is substituted in the cyclohexylene ring by $C_1$–$C_4$alkyl; or is a methylene-phenylene-methylene radical which is unsubstituted or is substituted in the phenylene ring by $C_1$–$C_4$alkyl, $C_1$–$C_4$alkoxy, halogen or sulfo.

4. An anthraquinone dye according to claim 1, in which $B_1$ is $C_2$–$C_{12}$alkylene which is uninterrupted or is interrupted by oxygen; or is a methylene-cyclohexylene radical or cyclohexylene-methylene radical which is unsubstituted or is substituted in the cyclohexylene ring by $C_1$–$C_4$alkyl; or is a methylene-phenylene-methylene radical.

5. An anthraquinone dye according to claim 1, in which $B_1$ is $C_2$–$C_6$alkylene.

6. An anthraquinone dye according to claim 1, in which $B_2$ is phenylene or naphthalene which is unsubstituted or is substituted by $C_1$–$C_4$alkyl, $C_1$–$C_4$alkoxy, $C_2$–$C_4$alkanoylamino, halogen, carboxyl or sulfo.

7. An anthraquinone dye according to claim 1, in which $B_2$ is phenylene which is unsubstituted or is substituted by $C_1$–$C_4$alkyl, $C_1$–$C_4$alkoxy, halogen or sulfo.

8. An anthraquinone dye according to claim 1, in which m is the number 1 and

Y is hydrogen or is $C_1$–$C_{12}$alkyl which is unsubstituted or is substituted by hydroxyl, sulfo or sulfato and, with the exception of methyl, is uninterrupted or is interrupted by oxygen; or is phenyl or naphthyl, where the phenyl and naphthyl radicals can be substituted by $C_1$–$C_4$alkyl, $C_1$–$C_4$alkoxy, $C_2$–$C_4$alkanoylamino, halogen, carboxyl or sulfo or by one fibre-reactive groups of the formulae $$-\underset{R'}{\overset{}{|}}N-CO-\underset{Hal}{\overset{}{|}}CH-CH_2-Hal, \quad (2a)$$

$$-\underset{R'}{\overset{}{|}}N-CO-\underset{Hal}{\overset{}{|}}C=CH_2, \quad (2b)$$

$$-SO_2-Z, \quad (2c)$$

$$-\underset{R}{\overset{}{|}}W\text{-alk-}SO_2-Z, \quad (2d)$$

$$-W\text{-alk-}E\text{-alk'-}SO_2-Z, \quad (2e)$$

$$\text{-alk-}W\text{-alk'-}SO_2-Z \quad \text{and} \quad (2f)$$
$$\underset{R}{\overset{}{|}}$$

$$-O\text{-alk-}W\text{-alk'-}SO_2-Z \quad (2g)$$
$$\underset{R}{\overset{}{|}}$$

in which

W is a group of the formula $-SO_2-NR_6-$, $-CONR_6-$ or $-NR_6CO-$, $R_6$ is hydrogen or is $C_1$–$C_4$alkyl which is unsubstituted or is substituted by hydroxyl, sulfo, sulfato, carboxyl or cyano, R is hydrogen, hydroxyl, sulfo, sulfato, carboxyl, cyano, halogen, $C_1$–$C_4$alkoxycarbonyl, $C_1$–$C_4$alkanoyloxy or carbamoyl, R' is hydrogen or $C_1$–$C_4$alkyl, Z is a group of the formula $-CH=CH_2$ or $-CH_2-CH_2-U_1$ and $U_1$ is a leaving group, Hal is halogen, E is the radical $-O-$ or $-NR_7-$ and $R_7$ is hydrogen or $C_1$–$C_4$alkyl, and alk and alk' are independently of one another $C_1$–$C_6$alkylene.

9. An anthraquinone dye according to claim 8, in which $R_1$, $R_2$, $R_3$ and $R_4$ are hydrogen or $C_1$–$C_4$alkyl, $R_5$ is hydrogen or is $C_1$–$C_8$alkyl which is unsubstituted or is substituted by hydroxyl, sulfo or sulfato and, with the exception of methyl, is uninterrupted or is interrupted by oxygen, $B_1$ is $C_2$–$C_{12}$alkylene which is uninterrupted or is interrupted by oxygen; or is a methylene-cyclohexylene radical, cyclohexylene-methylene radical or cyclohexylene-methylene-cyclohexylene radical which is unsubstituted or is substituted in the cyclohexylene ring by $C_1$–$C_4$alkyl; or is a methylene-phenylene-methylene radical which is unsubstituted or is substituted in the phenylene ring by $C_1$–$C_4$alkyl, $C_1$–$C_4$alkoxy, halogen or sulfo, $B_2$ is phenylene which is unsubstituted or is substituted by $C_1$–$C_4$alkyl, $C_1$–$C_4$alkoxy, halogen or sulfo, and Y is hydrogen or is $C_1$–$C_8$alkyl which is unsubstituted or is substituted by hydroxyl, sulfo or sulfato and, with the exception of methyl, is uninterrupted or is interrupted by oxygen; or is sulfo-substituted naphthyl; or is phenyl which can be substituted by $C_1$–$C_4$alkyl, $C_1$–$C_4$alkoxy, halogen or sulfo or by a fibre-reactive radical of the formulae (2a), (2b), (2c) or (2d), where W is a group of the formula —CO—NH—, R is hydrogen and $U_1$ is sulfato or chlorine.

10. An anthraquinone dye according to claim 9, in which $B_1$ is $C_2$–$C_6$alkylene and $B_2$ is sulfo-substituted phenylene.

11. An anthraquinone dye according to claim 1, in which m is the number 0 and

Y is phenyl or naphthyl which is unsubstituted or is substituted by $C_1C_4$alkyl, $C_1$–$C_4$alkoxy, $C_2$–$C_4$alkanoylamino, halogen, carboxyl or sulfo, where the phenyl and naphthyl radicals contain at least one of the fibre-reactive groups of the formulae

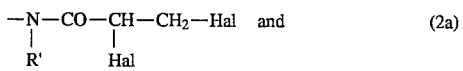

(2a)

(2b)

in which Hal is halogen and R' is hydrogen or $C_1$–$C_4$alkyl.

12. An anthraquinone dye according to claim 11, in which $R_1$, $R_2$, $R_3$ and $R_4$ are hydrogen or $C_1$–$C_4$alkyl, $R_5$ is hydrogen or is $C_1C_8$alkyl which is unsubstituted or is substituted by hydroxyl, sulfo or sulfato and, with the exception of methyl, is uninterrupted or is interrupted by oxygen, $B_1$ is $C_2$–$C_{12}$alkylene which is uninterrupted or is interrupted by oxygen; or is a methylene-cyclohexylene radical, cyclohexylene-methylene radical or cyclohexylene-methylene-cyclohexylene radical which is unsubstituted or is substituted in the cyclohexylene ring by $C_1$–$C_4$alkyl; or is a methylene-phenylene-methylene radical which is unsubstituted or is substituted in the phenylene ring by $C_1$–$C_4$alkyl, $C_1$–$C_4$alkoxy, halogen or sulfo, $B_2$ is phenylene which is unsubstituted or is substituted by $C_1$–$C_4$alkyl, $C_1$–$C_4$alkoxy, halogen or sulfo, and Y is phenyl which is unsubstituted or is substituted by $C_1$–$C_4$alkyl, $C_1C_4$alkoxy, halogen or sulfo, the phenyl radical containing at least one of the fibre-reactive groups of the formulae (2a) and (2b).

13. An anthraquinone dye according to claim 12, in which $B_1$ is $C_2$–$C_6$alkylene and $B_2$ is sulfo-substituted phenylene.

14. A process for the preparation of anthraquinone dyes according to claim 1, which comprises reacting with one another compounds of the formulae

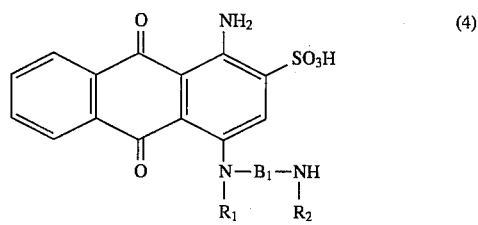

(4)

and

(5)

cyanuric fluoride or cyanuric chloride and, if desired, a compound of the formula

(6)

with or without a subsequent conversion reaction, $R_1$, $R_2$, $R_3$, $R_4$, $R_5$, $B_1$, $B_2$ and Y being as defined in claim 1.

15. A process for the dyeing or printing of a hydroxyl-containing or nitrogen-containing fibre material, which comprises applying to said fibre material an anthraquinone dye according to claim 1.

16. The process according to claim 15 for the dyeing or printing of cellulose-containing fibre materials or natural or synthetic polyamide fibre materials.

* * * * *